US009661165B2

(12) United States Patent
Ichiyama et al.

(10) Patent No.: US 9,661,165 B2
(45) Date of Patent: May 23, 2017

(54) IMAGE FORMING APPARATUS WITH PLAYBACK MODE, DISPLAY METHOD FOR AN OPERATION SCREEN, AND COMPUTER PROGRAM

(71) Applicant: Konica Minolta Inc., Chiyoda-ku (JP)

(72) Inventors: Shohei Ichiyama, Toyokawa (JP); Yoichi Kurumasa, Toyokawa (JP); Toshihisa Motosugi, Okazaki (JP); Mie Kawabata, Toyokawa (JP); Hiroaki Sugimoto, Midori-ku (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 85 days.

(21) Appl. No.: 14/552,640

(22) Filed: Nov. 25, 2014

(65) Prior Publication Data

US 2015/0146226 A1 May 28, 2015

(30) Foreign Application Priority Data

Nov. 27, 2013 (JP) ................................ 2013-245051

(51) Int. Cl.
*H04N 1/00* (2006.01)

(52) U.S. Cl.
CPC ....... *H04N 1/00506* (2013.01); *H04N 1/0049* (2013.01); *H04N 1/00381* (2013.01);
(Continued)

(58) Field of Classification Search
None
See application file for complete search history.

(56) References Cited

U.S. PATENT DOCUMENTS

2006/0214963 A1* 9/2006 Komatsu ................. 347/14
2007/0176946 A1* 8/2007 Matoba ................ 345/619
(Continued)

FOREIGN PATENT DOCUMENTS

JP 7-160149 A 6/1995
JP 2000-235549 A 8/2000
(Continued)

OTHER PUBLICATIONS

Decision of Rejection issued in corresponding Japanese Patent Application No. 2013-245051; dated Dec. 28, 2015, with English translation (6 pages).
(Continued)

*Primary Examiner* — Ming Hon
(74) *Attorney, Agent, or Firm* — Buchanan Ingersoll & Rooney PC

(57) ABSTRACT

An image forming apparatus includes a display and a touch panel, and is provided with a normal mode in which processing is performed every time operation is performed with the touch panel and a play back mode in which processing is performed on the basis of recording of the operation, and the image forming apparatus includes a controller configured to determine a gesture represented by a series of touch events, store gesture log data and touch event log data to a storage unit, and determine display control processing. In the normal mode, the display control processing is determined on the basis of the gesture or an object. In the play back mode, the display control processing is determined on the basis of the gesture log data or the touch event log data. The determined display control processing is executed.

10 Claims, 27 Drawing Sheets

(52) U.S. Cl.
CPC ..... *H04N 1/00411* (2013.01); *H04N 1/00474* (2013.01); *H04N 1/00949* (2013.01); *H04N 1/00954* (2013.01); *H04N 2201/0094* (2013.01)

(56) References Cited

U.S. PATENT DOCUMENTS

| | | |
|---|---|---|
| 2008/0036743 A1* | 2/2008 | Westerman et al. .......... 345/173 |
| 2010/0217762 A1 | 8/2010 | Kajio et al. |
| 2010/0333044 A1 | 12/2010 | Kethireddy |
| 2012/0206374 A1* | 8/2012 | Chen et al. ................... 345/173 |
| 2014/0082571 A1* | 3/2014 | Li ................................ 715/863 |

FOREIGN PATENT DOCUMENTS

| | | |
|---|---|---|
| JP | 2007-208440 A | 8/2007 |
| JP | 2008-040560 | 2/2008 |
| JP | 2009-116466 | 5/2009 |
| JP | 2011-008768 | 1/2011 |
| JP | 2013-161302 | 8/2013 |
| JP | 2013-206186 A | 10/2013 |
| JP | 2013-222229 A | 10/2013 |

OTHER PUBLICATIONS

Notice of Reasons for Rejection issued in corresponding Japanese Patent Application No. 2013-245051; dated Sep. 18, 2015, with English translation (7 pages).

* cited by examiner

| P | Q |
|---|---|
| TOUCH PANEL FLAT SURFACE POSITION | DISPLAY FLAT SURFACE POSITION |
| (PX1,PY1) | (QX1,QY1) |
| (PX2,PY2) | (QX2,QY2) |
| (PX3,PY3) | (QX3,QY3) |
| ⋮ | ⋮ |

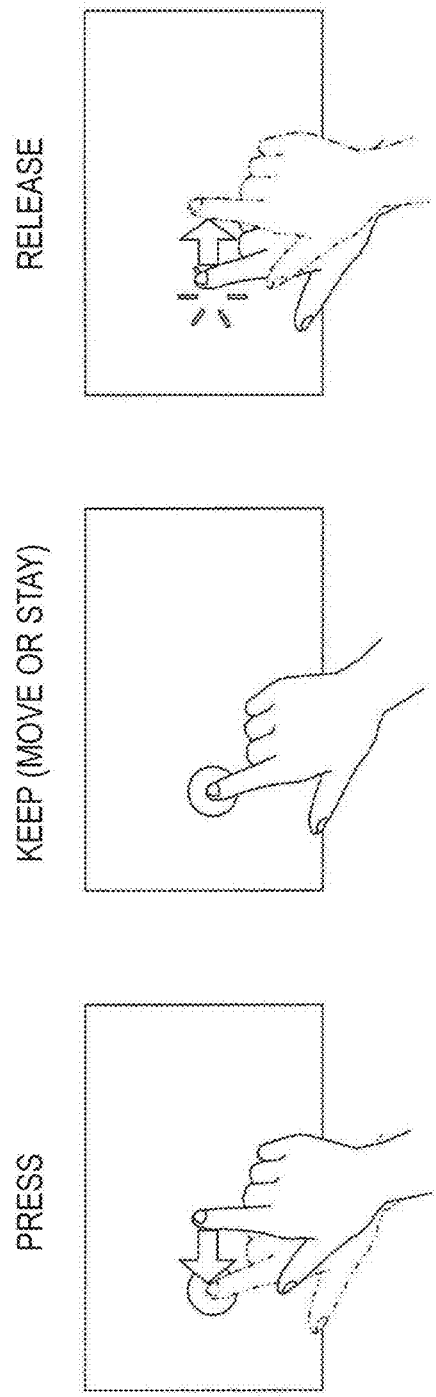

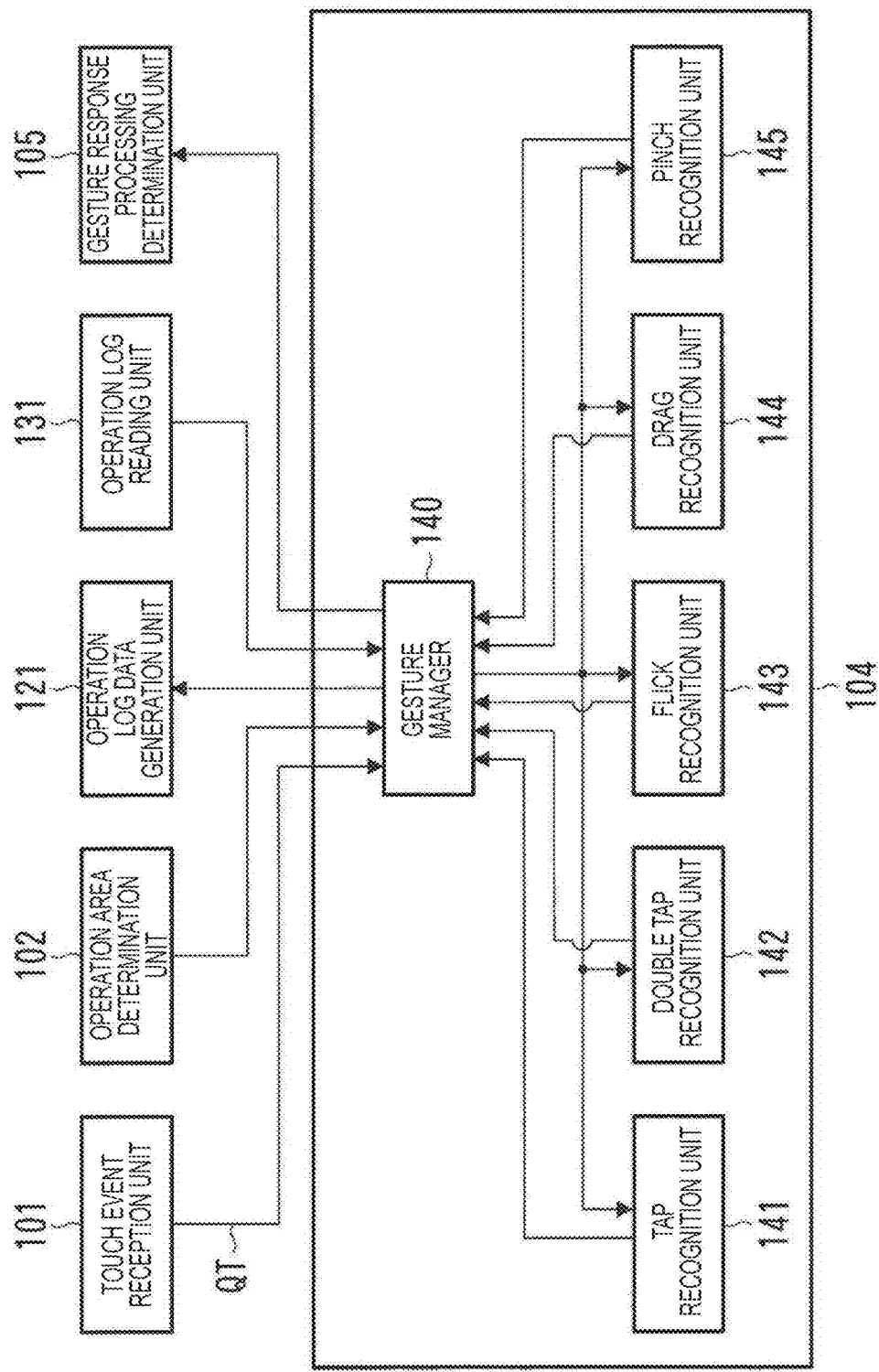

| OPERATION TYPE | OPERATION CONTENT | ELAPSED TIME (SECONDS) |
|---|---|---|
| TOUCH | PRESS, POSITION (760, 460) | 2.0 |
| TOUCH | KEEP, POSITION (760, 460) | 0.1 |
| TOUCH | KEEP, POSITION (760, 460) | 0.1 |
| ... | ... | ... |
| TOUCH | RELEASE, POSITION (760, 460) | 0.1 |
| PRESS DOWN KEY | HARD KEY「1」 | 2.5 |
| ... | ... | ... |
| GESTURE | FLICK, POSITION (300,120), STRENGTH 35, DIRECTION (-20, 0) | 8.2 |
| PRESS DOWN KEY | HARD KEY "START" | 5.1 |
| ... | ... | ... |

| TYPE | OPERATION CONTENT | ELAPSED TIME (SECONDS) | |
|---|---|---|---|
| TOUCH | PRESS, POSITION (171, 350) | 3.5 | 5Fa1 |
| TOUCH | KEEP, POSITION (171, 350) | 0.1 | 5Fa2 |
| TOUCH | KEEP, POSITION (171, 350) | 0.1 | 5Fa3 |
| TOUCH | RELEASE, POSITION (171, 350) | 0.1 | 5Fa4 |
| GESTURE | FLICK, POSITION (114, 265), SPEED 35, TIME 0.2, DIRECTION(-1,0) | 4.5 | 5Fb |
| GESTURE | DOUBLE TAP, POSITION (124, 276) | 3.0 | 5Fc |
| GESTURE | PINCH, POSITION (324, 361), SPEED 15, TIME 0.3, DIRECTION (10, 7) | 2.7 | 5Fd |
| GESTURE | TAP, POSITION (571, 233) | 3.3 | 5Fe |
| GESTURE | TAP, POSITION (562, 329) | 4.1 | 5Ff |
| PRESS DOWN KEY | "FUNCTION KEY 4 (HOME)" | 3.8 | 5Fg |

IMAGE FORMING APPARATUS WITH PLAYBACK MODE, DISPLAY METHOD FOR AN OPERATION SCREEN, AND COMPUTER PROGRAM

The entire disclosure of Japanese Patent Application No. 2013-245051 filed on Nov. 27, 2013 including description, claims, drawings, and abstract are incorporated herein by reference in its entirety.

BACKGROUND OF THE INVENTION

Field of the Invention

The present invention relates to a technique for displaying an image on a display in accordance with operation performed on a touch panel.

Description of the Related Art

In recent years, image forming apparatuses having various kinds of functions such as a copier, a scanner, a facsimile machine, a PC print, and a box (document server) are widely available. Such image forming apparatus may be referred to as a "multi-function apparatus" or an "MFP (Multi Function Peripherals)".

With the advancement in the performance of hardware such as an ADF (Auto Document Feeder), a print engine, a CPU (Central Processing Unit), a RAM (Random Access Memory), and a large-capacity storage apparatus and with the progress in the environment of development of software, various kinds of supplementary functions used together with the above functions are developed.

As described above, an image forming apparatus has more and more functions. With the increase in the number of functions, a user can cause the image forming apparatus to execute various kinds of processing.

However, with the increase in the variations of processing that can be executed, the operation of the image forming apparatus is likely to become more complicated. Likewise, an operation of setting that should be done by an administrator is likely to become more complicated.

Therefore, a method has been suggested, which includes recording a log of a model operation in advance, and playing back an operation based on this log for a user who wants to know how to perform the operation (JP 2000-235549 A, JP H7-160149 A). The user can confirm how to perform operation by seeing the transition of screens displayed on the display when the operation is played back.

A touch panel supporting multi touch is employed as a touch panel for a touch panel display, and various kinds of gestures can be recognized (JP 2013-222229 A). Therefore, various kinds of operations can be performed on a screen and the objects constituting the screen. Accordingly, in recent years, the operation of the image forming apparatus is becoming more complicated.

Therefore, according to the method described in JP 2000-235549 A, JP H7-160149 A, it may be possible to record a log of a model operation in advance, and play back an operation based on this log for a user who wants to know how to perform the operation.

However, the method described in JP 2000-235549 A is a method performed in a case where a mouse is used as an input device. The method described in JP H7-160149 A is a method performed when a key is used as an input device. Therefore, with such conventional methods, processing of display based on operation may not be finely played back in a case where a touch panel is used as an input device.

SUMMARY OF THE INVENTION

The present invention has been made in view of such problem, and it is an object of the present invention to play back, in a more reliable manner than the conventional technique, processing of display based on operation performed on a touch panel.

To achieve at least one of the abovementioned objects, according to an aspect, an image forming apparatus comprising a display and a touch panel provided on a display surface of the display, the image forming apparatus comprising a normal mode in which processing is performed every time operation is performed with the touch panel and a playback mode in which processing is performed on the basis of recording of the operation, reflecting one aspect of the present invention, comprises a controller configured to, determine a gesture represented by the series of touch events every time a series of touch events is performed on a first area of the touch panel in the normal mode, store gesture log data representing the gesture determined and touch event log data representing the series of touch events performed on a second area of the touch panel to a storage unit, determine display control processing for displaying an operation screen on the display, wherein in the normal mode, a) in a case where the series of touch events is performed on the first area, the display control processing is determined on the basis of the gesture determined, and b) in a case where the series of touch events is performed on the second area, the display control processing is determined on the basis of an object at a position where the series of touch events is performed, and wherein in the play back mode, c) in a case where the series of touch events is performed on the first area, the display control processing is determined on the basis of the gesture log data, and d) in a case where the series of touch events is performed on the second area, the display control processing is determined on the basis of the touch event log data, and execute the determined display control processing.

To achieve at least one of the abovementioned objects, according to an aspect, an image forming apparatus comprising a display and a touch panel provided on a display surface of the display, the image forming apparatus comprising a normal mode in which processing is performed every time operation is performed with the touch panel and a play back mode in which processing is performed on the basis of recording of the operation, reflecting one aspect of the present invention, comprises a controller configured to, determine a gesture represented by the series of touch events every time a series of touch events is performed on the touch panel in the normal mode, obtain gesture log data representing the gesture represented by the series of touch events performed on a second touch panel of another image forming apparatus, determine display control processing for displaying an operation screen on the display, on the basis of the determined gesture log and the obtained gesture log data, wherein e) in the normal mode, the display control processing is determined on the basis of the determined gesture, f) in the play back mode, the display control processing is determined on the basis of the obtained gesture log data, and execute the determined display control processing.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 5 is a figure illustrating an example of position correspondence data;

FIGS. 9A to 9C are figures illustrating an example of basic touch operation;

FIG. 10 is a figure illustrating an example of a configuration of a gesture determination unit;

FIG. 12 is a figure illustrating an example of operation log data;

FIG. 23 is a figure illustrating an example of operation log data;

DESCRIPTION OF THE PREFERRED EMBODIMENTS

Hereinafter, an embodiment of the present invention will be described with reference to the drawings. However, the scope of the invention is not limited to the illustrated examples.

Figure 1:
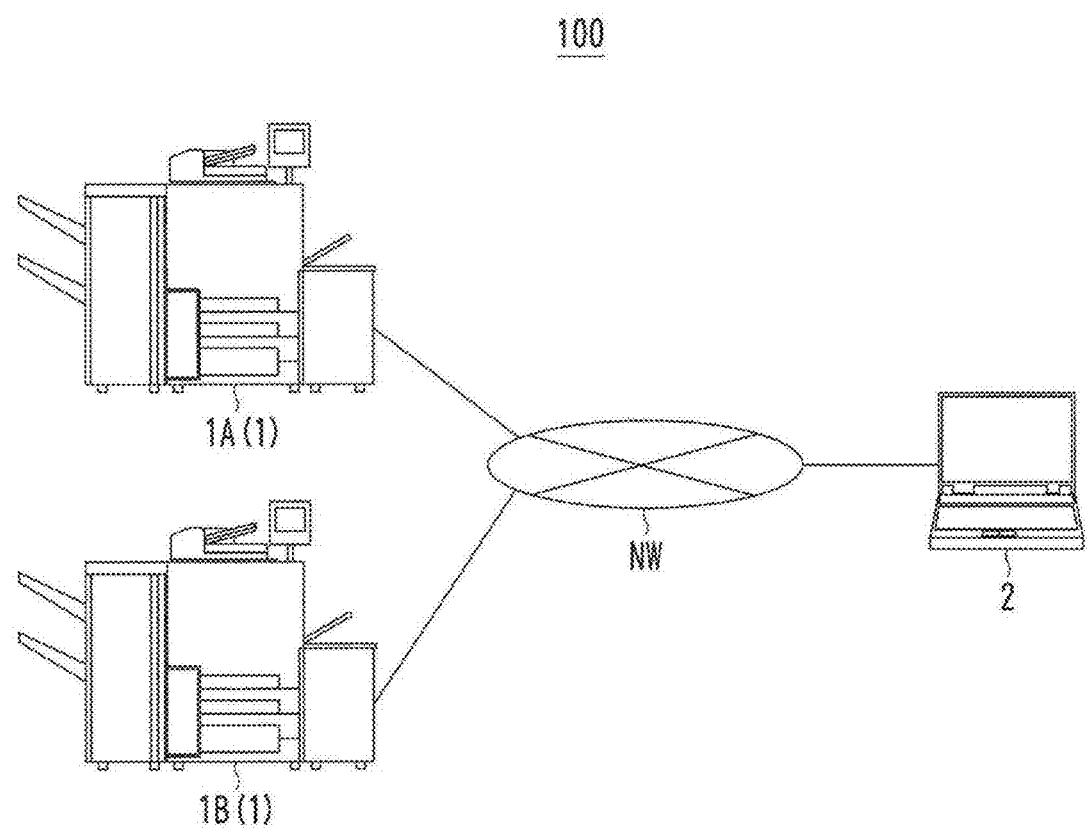
FIG. 1 is a figure illustrating an example of a network system.
Figure 2:
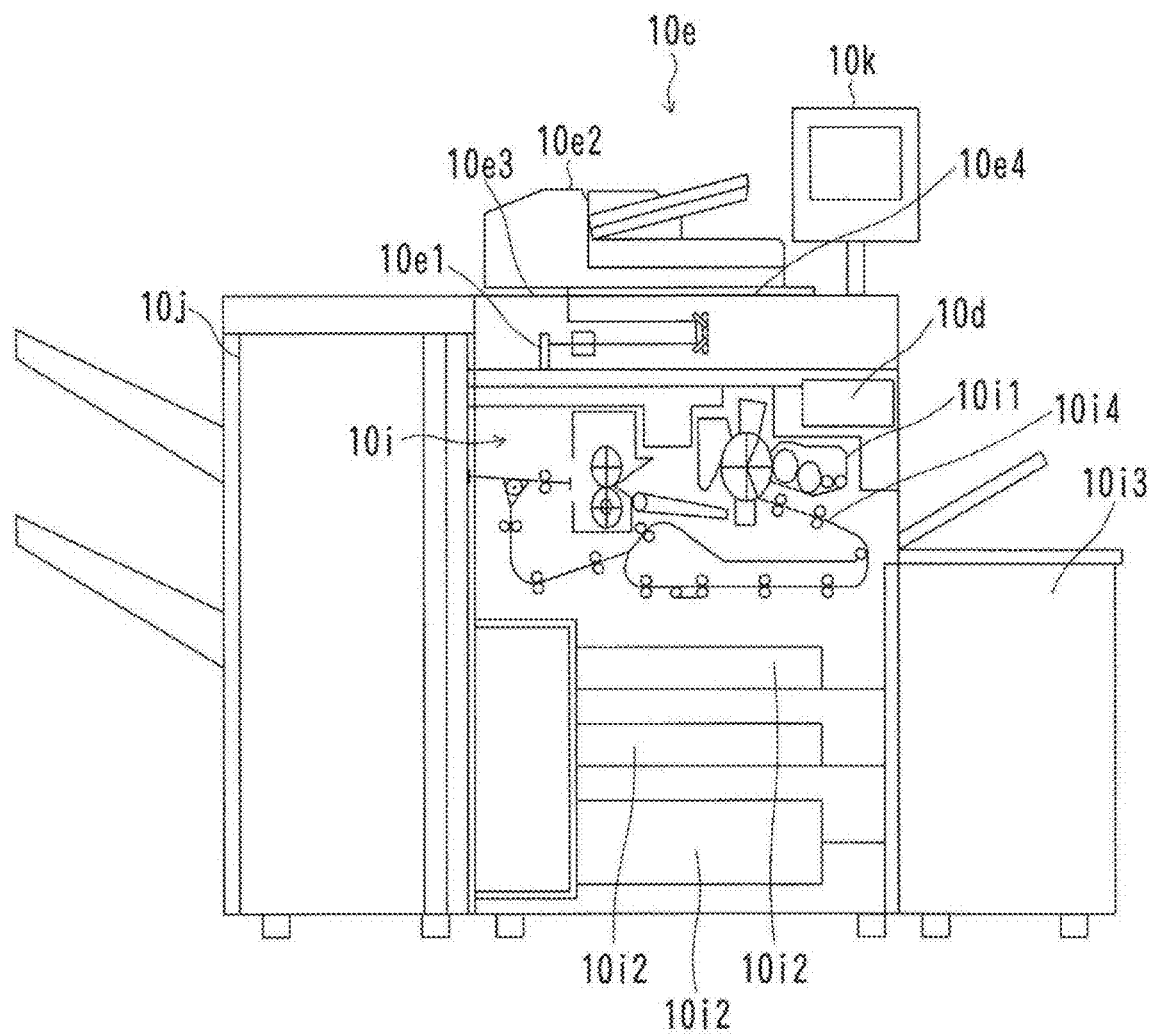
FIG. 2 is a figure illustrating an example of an external appearance and an inside of an image forming apparatus.
Figure 3:
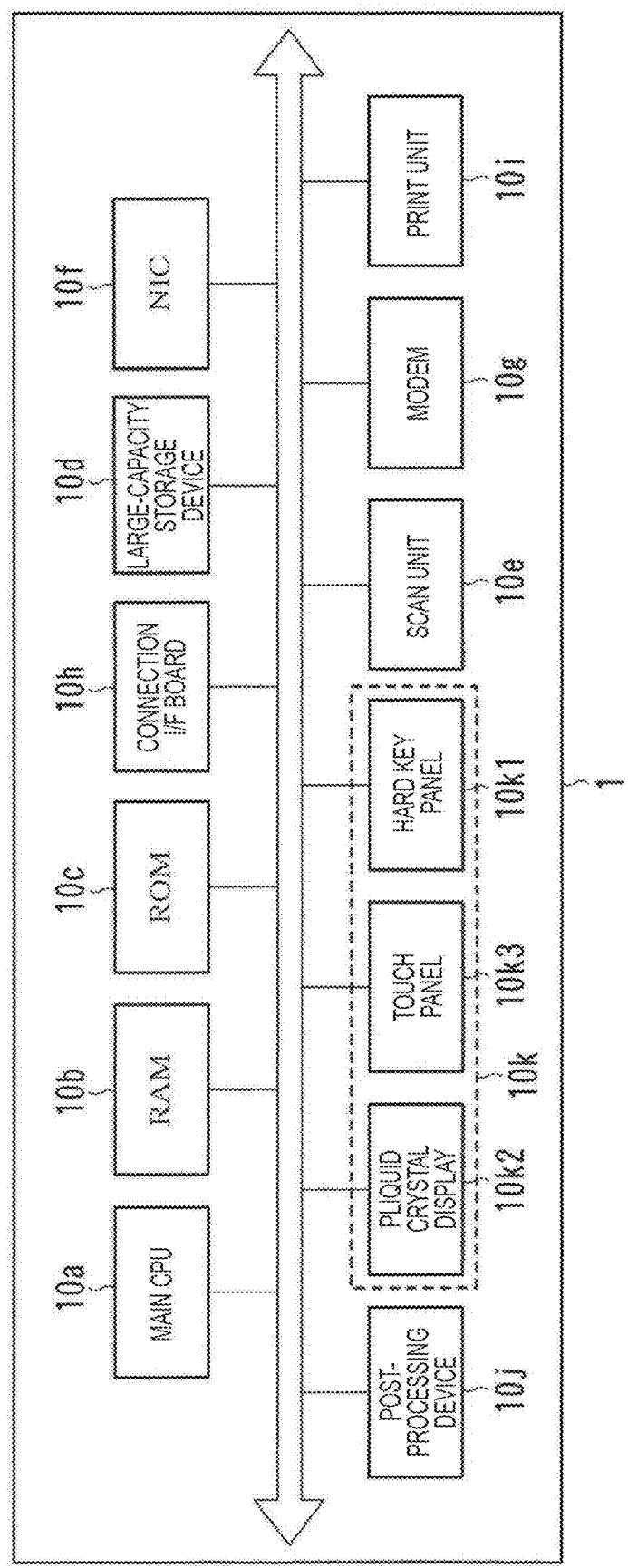
FIG. 3 is a figure illustrating an example of a hardware configuration of the image forming apparatus.
Figure 4:
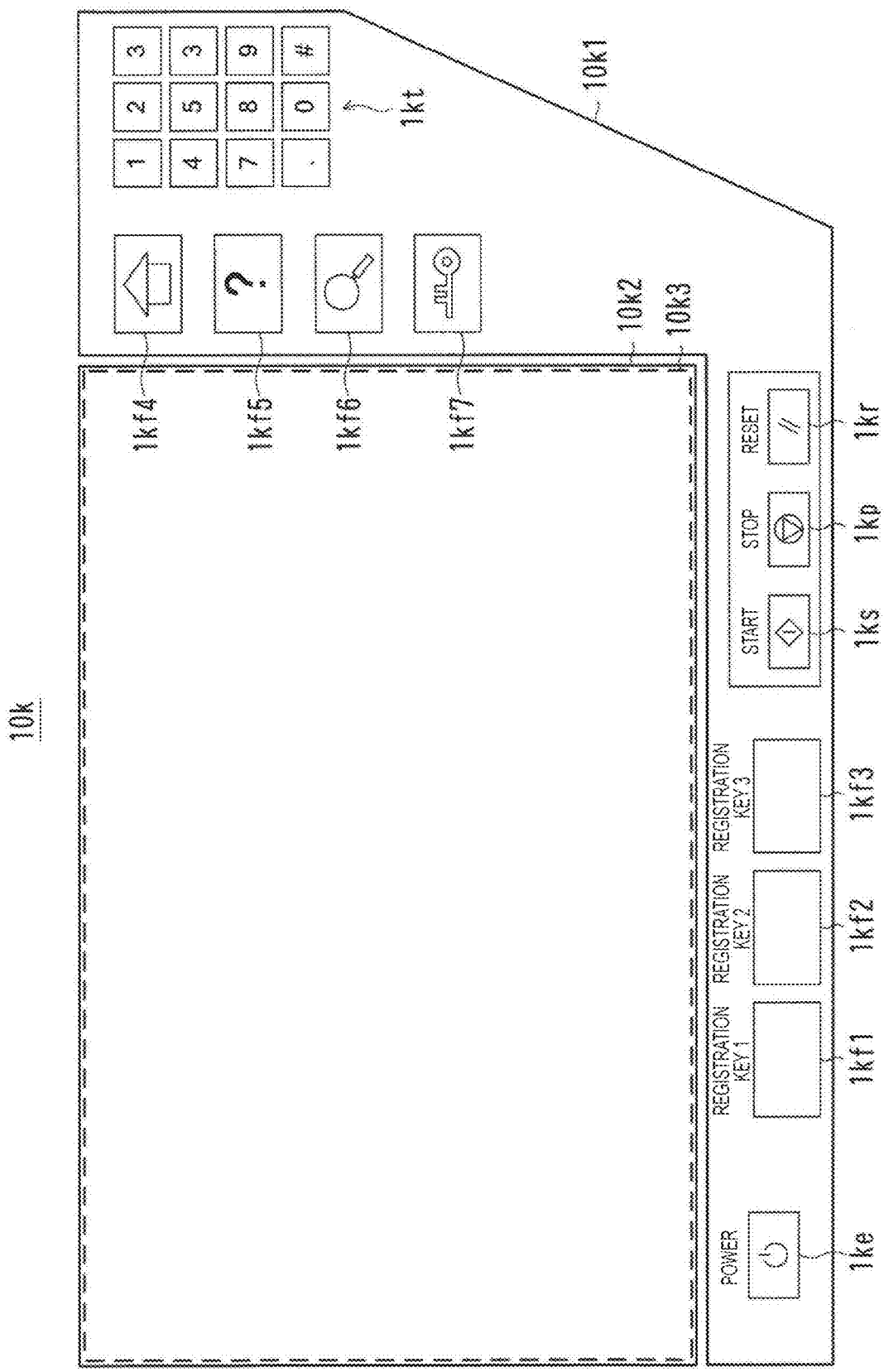
FIG. 4 is a figure illustrating an example of a configuration of an operation panel unit.
Figure 6:
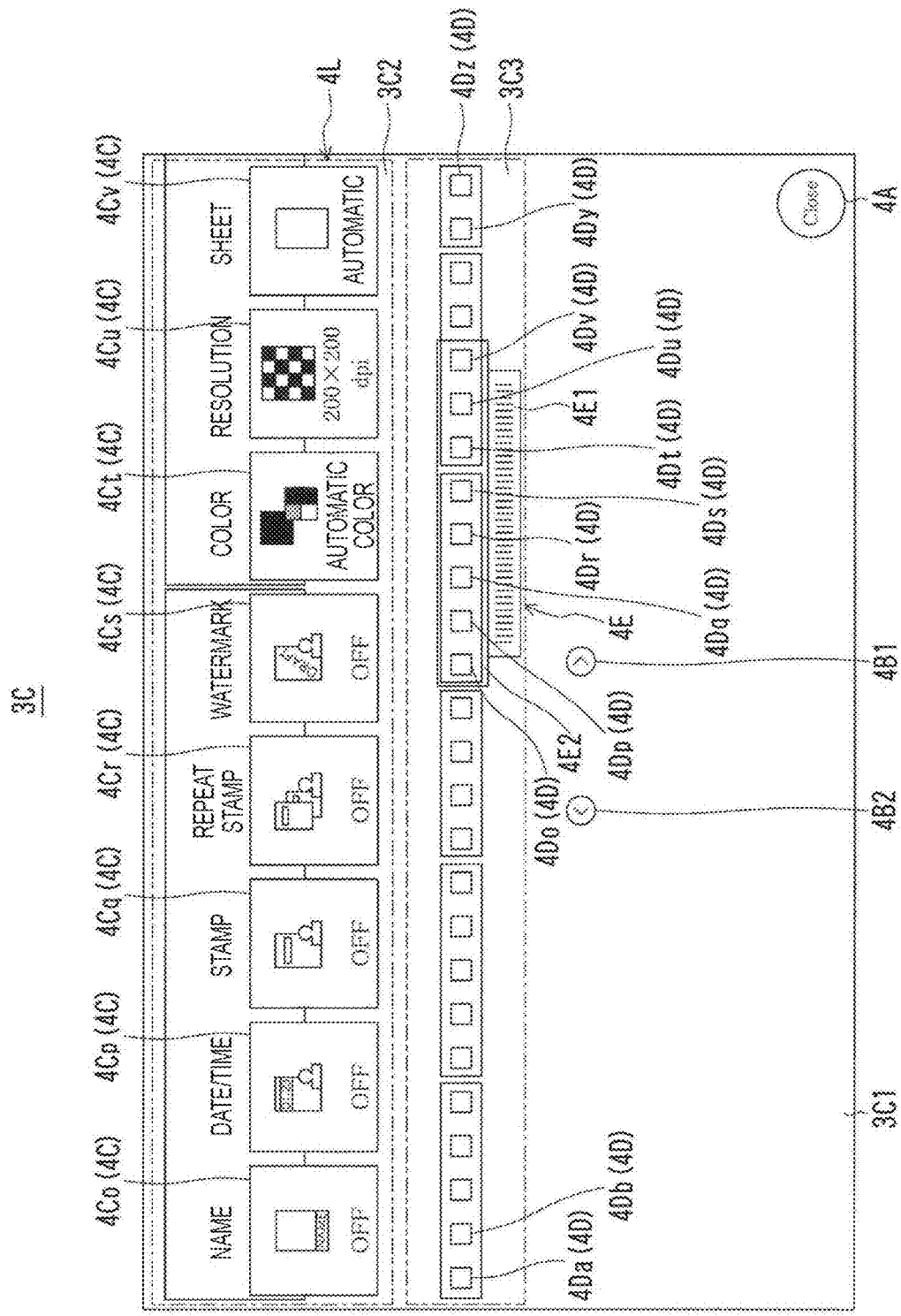
FIG. 6 is a figure illustrating an example of a copy job screen.
Figure 7:
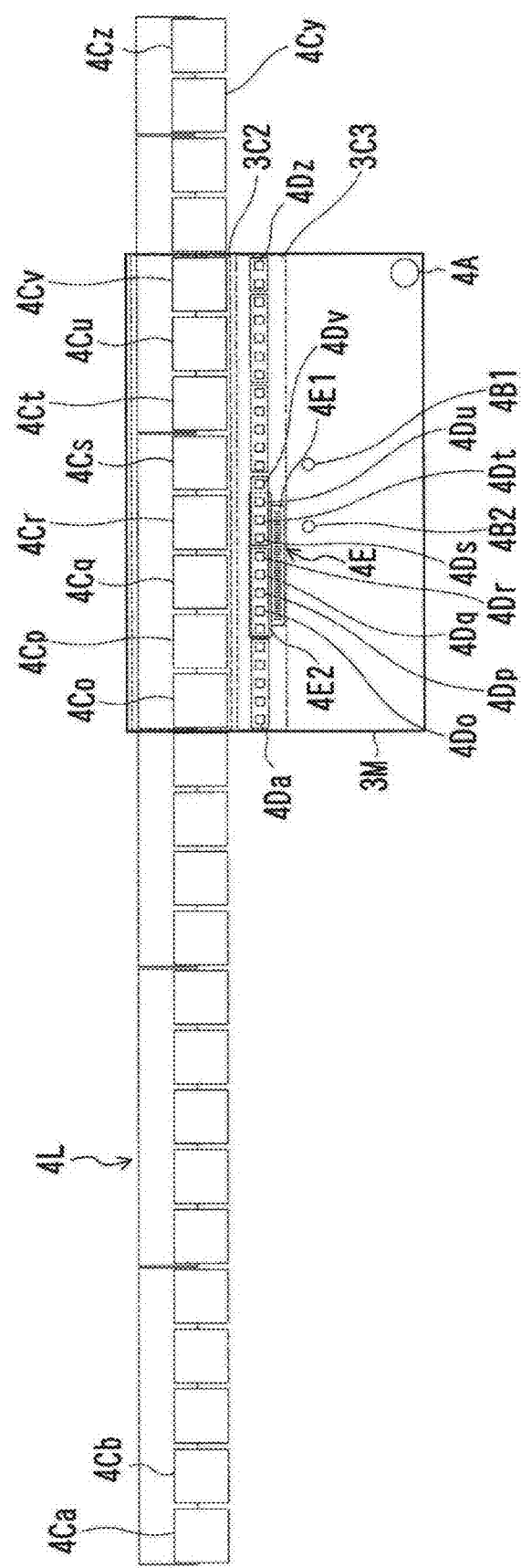
FIG. 7 is a figure for explaining relationship between a batch row and the copy job screen.
Figure 8:
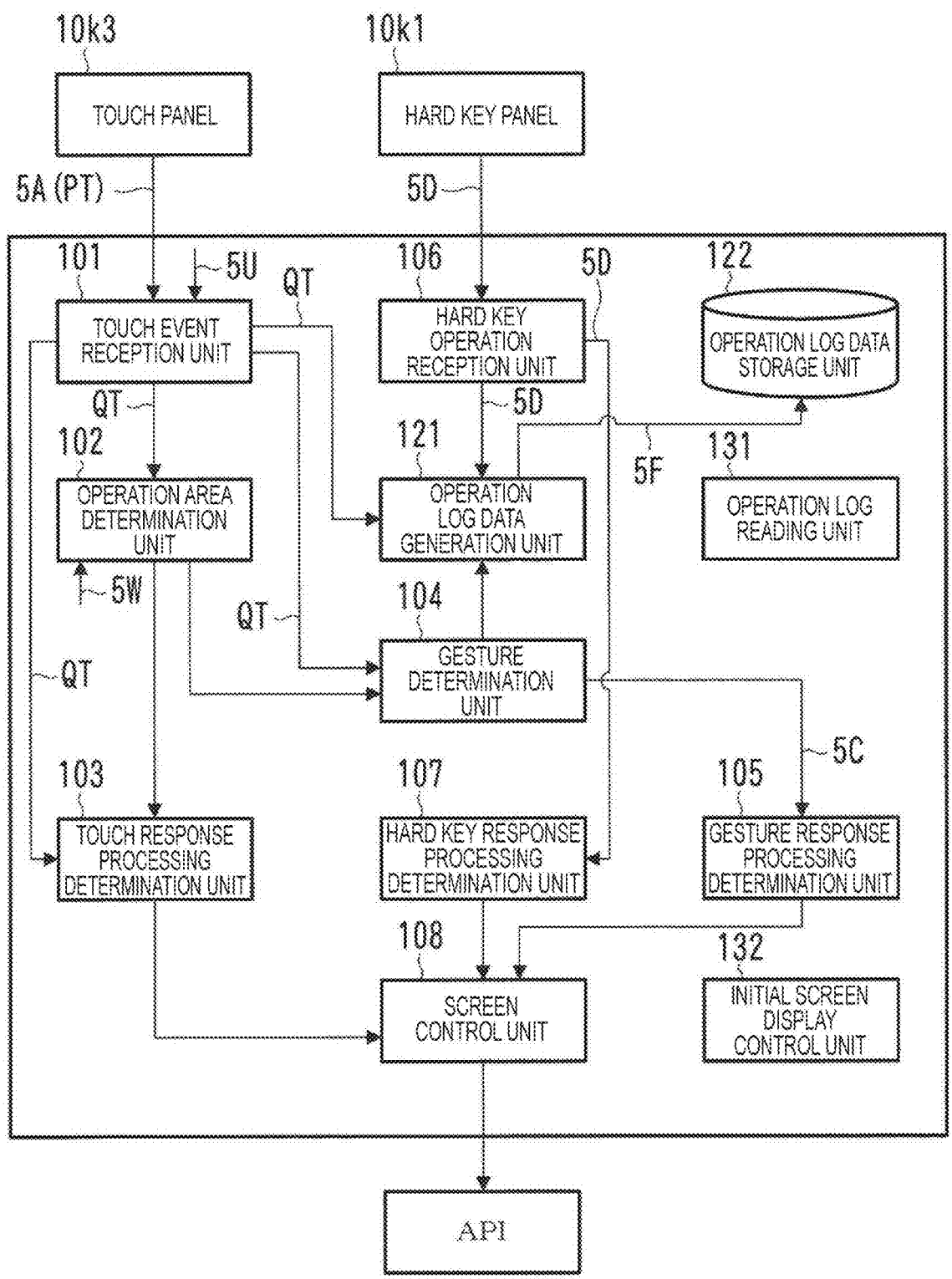
FIG. 8 is a figure illustrating an example of functional configuration of the image forming apparatus and an example of a flow of data when operation is recorded.

FIG. 1 is a figure illustrating an example of a network system 100. FIG. 2 is a figure illustrating an example of an external appearance and an inside of an image forming apparatus 1. FIG. 3 is a figure illustrating an example of a hardware configuration of the image forming apparatus 1. FIG. 4 is a figure illustrating an example of a configuration of an operation panel unit 10k. FIG. 5 is a figure illustrating an example of position correspondence data 5U. FIG. 6 is a figure illustrating an example of a copy job screen 3C. FIG. 7 is a figure for explaining relationship between a batch row 4L and the copy job screen 3C. FIG. 8 is a figure illustrating an example of functional configuration of the image forming apparatus 1 and an example of a flow of data when operation is recorded.

As shown in FIG. 1, the network system 100 includes multiple image forming apparatuses 1, a terminal apparatus 2, a communication network NW, and the like. Each image forming apparatus 1 and the terminal apparatus 2 can communicate via a communication network NW. Examples available communication networks NW include a public circuit, a private line, the Internet, or a so-called local area network (AN) network. Hereinafter, the image forming apparatuses 1 may be separated and referred to as an "image forming apparatus 1A", an "image forming apparatus 1B", . . . .

The image forming apparatus 1 is generally an image processing apparatus called an multi function peripherals (MFP) or a multi-function apparatus, and is an apparatus collectively including the functions of a copy, a PC print (network printing), a facsimile machine, a scanner, a box, and the like.

The box function is a function for giving a storage area called a "box", "personal box", or the like to each user, and allowing each user to save and manage document data such as image files and the like in the user's storage area. The box corresponds to a "folder" or "directory" in a personal computer.

As shown in FIG. 2 or FIG. 3, the image forming apparatus 1 includes a main central processing unit (CPU) 10a, a random access memory (RAM) 10b, a read only memory (ROM) 10c, a large-capacity storage apparatus 10d, a scan unit 10e, a network interface card (NIC) 10f, a modem 10g, a connection interface board 10h, a print unit 10i, a post-processing apparatus 10j, an operation panel unit 10k, and the like.

The scan unit 10e reads images such as pictures, characters, drawings, and figures described on a sheet, thus generating image data. More specifically, the scan unit 10e includes an image sensor 10e1, an auto document feeder (ADF) 10e2, a reading slit 10e3, a platen glass 10e4, and the like.

The ADF 10e2 conveys each sheet, which has been set, to the reading slit 10e3. Then, when the sheet passes through the reading slit 10e3, the image sensor 10e1 reads the image from the sheet and generates electronic data of the image. When the user sets an original document on the platen glass 10e4, the image sensor 10e1 scans the platen glass 10e4 to read the image from the sheet, thus generating electronic data of the image.

The NIC 10f communicates with an apparatus such as a terminal apparatus 2 using a protocol such as transmission control protocol/internet protocol (TCP/IP).

The modem 10g communicates with a facsimile terminal using a protocol such as G3 via a fixed-line telephone network.

The connection interface board 10h is an apparatus for connecting a peripheral device with an image forming apparatus 1. For example, the connection interface board 10*h* may be universal serial bus (USB) board or Institute of Electrical and Electronics Engineers (IEEE) 1394 board.

The print unit 10*i* prints, on a sheet, an image that is read by the scan unit 10*e*, or an image that is input via the NIC 10*f*, the modem 10*g*, or the connection interface board 10*h*. More specifically, the print unit 10*i* includes an engine unit 10*i*1, a sheet-feeding tray 10*i*2, a large-capacity sheet-feeding tank 10*i*3, a sheet conveying mechanism 10*i*4, and the like.

One or more sheet-feeding tray 10*i*2 are provided on the print unit 10*i*. Each of the sheet-feeding tray 10*i*2 stores a sheet (white paper) of a predetermined size. The large-capacity sheet-feeding tank 10*i*3 also stores a sheet (white paper) of a predetermined size, but has a larger capacity than the sheet-feeding tray 10*i*2. Therefore, the large-capacity sheet-feeding tank 10*i*3 stores sheets of a size that is most frequently used in normal circumstances.

The sheet conveying mechanism 10*i*4 conveys each sheet from the sheet-feeding tray 10*i*2 or the large-capacity sheet-feeding tank 10*i*3 to the engine unit 10*i*1. The engine unit 10*i*1 prints an image on a sheet. Then, the sheet conveying mechanism 10*i*4 conveys the sheet having the image printed thereon to a sheet-discharge tray or a bin. It should be noted that when it is necessary to perform post-processing (such as processing for binding with staples or processing for making punch holes), the sheet having the image printed thereon is conveyed to the post-processing apparatus 10*j*.

The post-processing apparatus 10*j* applies the post-processing to one or more sheets having the images printed thereon.

The operation panel unit 10*k* is a unit for a user interface, and as shown in FIG. 4, the operation panel unit 10*k* includes a hard key panel 10*k*1, a liquid crystal display (LCD) 10*k*2, a touch panel 10*k*3, and the like.

Then hard key panel 10*k*1 is an input device including keys such as numeric keys 1*kt*, a start key 1*ks*, a stop key 1*kp*, a reset key 1*kr*, a power key 1*ke*, and function keys 1*kf*1 to 1*kf*7. Generally, these keys may be referred to as "hard keys" or "hardware keys" so that these keys are distinguished from keys displayed on the liquid crystal display 10*k*2 (so-called software keys). Among the function keys 1*kf*1 to 1*kf*7, the function key 1*kf*2 is allocated with a command for start and ending recording of operation explained later. The function key 1*kf*4 is allocated with a command for displaying a home screen 3T explained later. Therefore, in the following explanation, the function key 1*kf*2 will be referred to as a "start end command key 1*kf*2", and the function key 1*kf*4 will be referred to as a "home key 1*kf*4".

The liquid crystal display 10*k*2 displays, e.g., a screen indicating a message to a user, a screen indicating a result of processing, or a screen for allowing a user to input a command or condition to the image forming apparatus 1.

The touch panel 10*k*3 is provided to cover the entire display surface of the liquid crystal display 10*k*2 in a fixed manner, and is configured to detect the position touched (pressed) by the user, and notify the position to the main CPU 10*a*. The touch panel 10*k*3 may be, for example, a capacitive touch panel, a surface acoustic wave touch panel, or an electromagnetic induction touch panel.

Data (for example, table) showing which position of the liquid crystal display 10*k*2 each position of the touch panel 10*k*3 is located at as shown in FIG. 5 are prepared in advance. More specifically, data indicating corresponding relationship between a position of the touch panel 10*k*3 and a position of the liquid crystal display 10*k*2 are prepared in advance. Hereinafter, the data will be referred to as "position correspondence data 5U". A position on the touch panel 10*k*3 will be referred to as a "touch panel flat surface position P", and a position on the liquid crystal display 10*k*2 will be referred to as a "display flat surface position Q".

When the touch panel 10*k*3 is touched, the main CPU 10*a* derives the display flat surface position Q corresponding to the touched touch panel flat surface position P on the basis of the position correspondence data 5U, and can perform processing while the main CPU 10*a* assumes that the display flat surface position Q is touched. Further, the main CPU 10*a* can perform processing while the main CPU 10*a* assumes that the pixel at the display flat surface position Q in a screen currently displayed in the liquid crystal display 10*k*2 (hereinafter referred to as "current screen") is touched.

According to such mechanism, the user can operate the current screen by touching the current screen by means of the touch panel 10*k*3.

On the screen, various types of objects are arranged. For example, the copy job screen 3C of FIG. 6 is arranged with objects such as a close button 4A, a right scroll button 4B1, a left scroll button 4B2, multiple optional function badges 4C, multiple markers 4D, and a slide gauge 4E.

The close button 4A is a button for closing the copy job screen 3C and displaying a previous screen again.

The optional function badge 4C is an icon representing an optional function, and is prepared for each optional function provided in the image forming apparatus 1. The optional function badges 4C are arranged in a row horizontally, and forms a batch row 4L. However, all the optional function badges 4C cannot be arranged at a time. More specifically, as shown in FIG. 7, only some of the optional function badges 4C appear in the copy job screen 3C, and the remaining optional function badges 4C do not appear therein.

The user can display the remaining optional function badges 4C in order by scrolling the batch row 4L. Hereinafter, the optional function badges 4C may be distinguished from each other and may be referred to as an "optional function badge 4C*a*", an "optional function badge 4C*b*", . . . , an "optional function badge 4C*z*" which are arranged from the left.

The right scroll button 4B1 is a button for scrolling the batch row 4L from the right to the left. The left scroll button 4B2 is a button for scrolling the batch row 4L from the left to the right.

Like the optional function badges 4C, the markers 4D are also arranged in a row horizontally. As many markers 4 as the function badges 4C are provided. From the left, the markers 4 respectively correspond to the function badge 4C*a*, the function badge 4C*b*, . . . , the function badge 4C*z*. However, all the markers 4D appear in the copy job screen 3C at the same time. Hereinafter, the markers 4D corresponding to the optional function badge 4C*a*, the optional function badge 4C*b*, . . . , the optional function badge 4C*z* may be distinguished from each other and may be referred to as a "marker 4D*a*", a "marker 4D*b*", . . . , a "marker 4D*z*", respectively.

The slide gauge 4E is constituted by a slide bar 4E1 and a window 4E2. The slide bar 4E1 moves to the left or the right in accordance with dragging or flicking.

The window 4E2 is provided immediately above the slide bar 4E1. Further, as many markers 4D as the number corresponding to an optional function badge 4C currently arranged in the copy job screen 3C are enclosed.

The window 4E2 is fixed to the slide bar 4E1. Therefore, the window 4E2 moves together when the slide bar 4E1 moves. The user can change the markers 4D enclosed by the window 4E2 by operating the slide bar 4E1. When the markers 4D enclosed by the window 4E2 are changed, the batch row 4L scrolls accordingly, and this changes the optional function badges 4C arranged in the copy job screen 3C.

The user can scroll the batch row 4L by directly dragging or flicking.

When the batch row 4L is scrolled by the right scroll button 4B1 or the left scroll button 4B2, the slide gauge 4E moves in accordance with new arrangement of the optional function badges 4C in the copy job screen 3C.

By the way, the liquid crystal display 10k2 may display a screen the entirety of which is a single area, and may display a screen divided into multiple areas. Hereinafter, areas constituting the screen will be referred to as "constituent element areas". Further, the constituent element areas are classified into any one of a simple operation area and a gesture area.

The "simple operation area" is an area for receiving only tapping as a user's action (operation). On the other hand, the "gesture area" is an area for receiving various kinds of gestures such as tap, flick, drag, and double tap as a user's action.

Which constituent element area each pixel in each screen belongs to and which of the simple operation area and the gesture area each constituent element area belongs to are defined in advance, and are defined in data to be displayed on each screen (hereinafter referred to as "screen data 5W").

The copy job screen 3C of FIG. 6 is divided into a first constituent element area 3C1, a second constituent element area 3C2, and a third constituent element area 3C3, and the first constituent element area 3C1 is set in the simple operation area, and the second constituent element area 3C2 and the third constituent element area 3C3 are set in the gesture area.

Back to FIG. 2 and FIG. 3, the ROM 10c or the large-capacity storage apparatus 10d store the program for achieving the functions such as copier and PC print as explained above. Further, the ROM 10c or the large-capacity storage apparatus 10d store the program for realizing the functions such as the touch event reception unit 101, the operation area determination unit 102, the touch response processing determination unit 103, the gesture determination unit 104, the gesture response processing determination unit 105, the hard key operation reception unit 106, the hard key response processing determination unit 107, the screen control unit 108, the operation log data generation unit 121, the operation log data storage unit 122, the operation log reading unit 131, and the initial screen display control unit 132 as shown in FIG. 8.

These programs are loaded to the RAM 10b as necessary, and executed by the main CPU 10a.

The touch event reception unit 101 to the condition change unit 133 as shown in FIG. 8 control each hardware so as to display a screen or execute a job on the basis of operation performed by the user with the operation panel unit 10k. Further, the log of operation can be recorded, and thereafter, the operation can be played back on the basis of this log.

Hereinafter, the processing of the touch event reception unit 101 to the screen control unit 108 will be explained while it is roughly divided into basic operation based on operation, processing for recording operation, and processing for playing back the operation on the basis of the recording. A mode for performing processing according to user's operation in real time will be referred to as "normal mode", and a mode for performing processing by playing back operation based on recording will be referred to as "play back mode".

[Basic Processing Based on Operation]

Figure 11A:
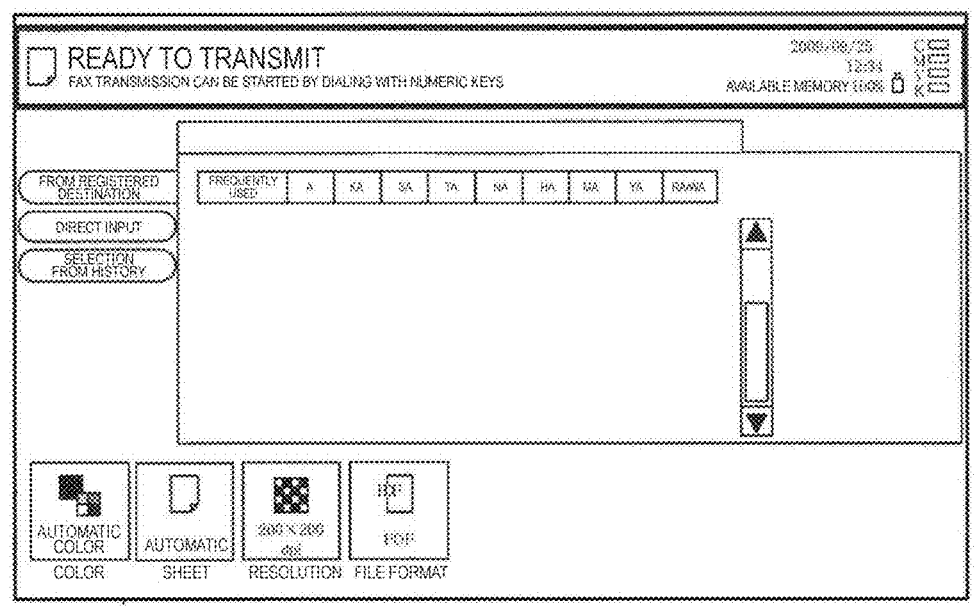
FIGS. 11A and 11B are figures illustrating an example of a facsimile transmission job screen.
Figure 11B:
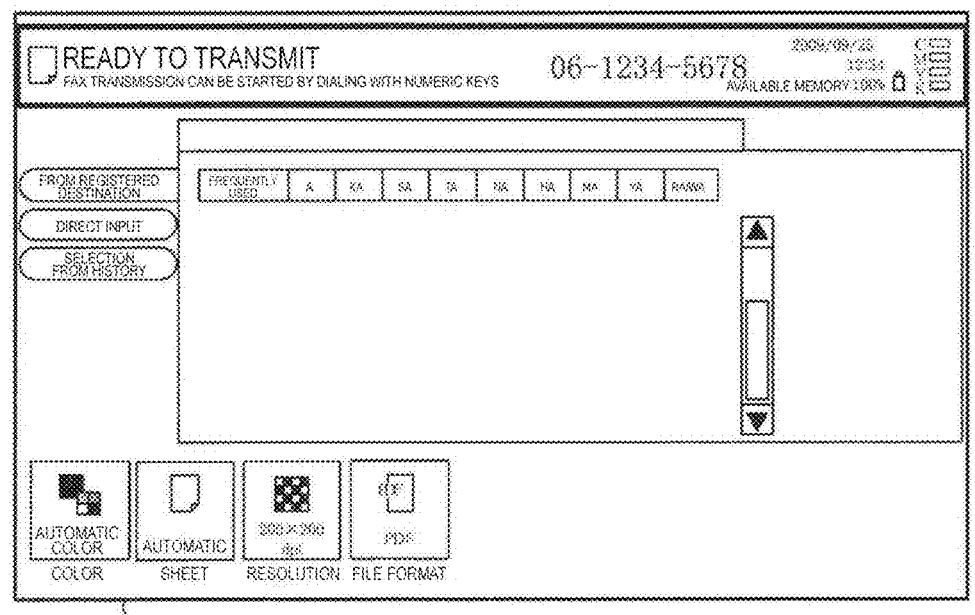

FIGS. 9A to 9C are figures illustrating an example of basic touch operation. FIG. 10 is a figure illustrating an example of a configuration of the gesture determination unit 104. FIGS. 11A and 11B are figures illustrating an example of a facsimile transmission job screen 3F.

The touch event reception unit 101 to the screen control unit 108 of FIG. 8 perform the processing as follows in accordance with user's operation in real time with the hard key panel 10k1 or touch panel 10k3 in the normal mode.

When the touch panel 10k3 detects touching, the touch panel 10k3 outputs a touch position signal 5A indicating the touched touch panel flat surface position P (hereinafter referred to as a "touch position PT") every time the predetermined time Ta passes until the touch is finished (which means that a finger or a pen leaves the touch panel 10k3).

Every time the touch event reception unit 101 receives a touch position signal 5A, the touch event reception unit 101 calculates a display flat surface position Q corresponding to the touch position PT indicated by the touch position signal 5A (hereinafter described as "touch position QT") on the basis of the position correspondence data 5U (see FIG. 5).

Further, the touch event reception unit 101 detects the event performed with the touch panel 10k3 (hereinafter referred to as "touch event") as follows, every time the touch position signal 5A is received, and when the touch position signal 5A is interrupted.

The touch event reception unit 101 detects "press" as shown in FIG. 9A as a touch event when the touch position signal 5A was not received at a time the predetermined time Ta before the present time but a new touch position signal 5A was received.

After the press, when the touch position signal 5A is received every time the predetermined time Ta passes, the touch event reception unit 101 detects "keep" shown in FIG. 9B as a touch event. In general, "keep" can be classified into two cases, including "move" in which case the touch position changes and "stay" in which case the position does not change. It may be possible to distinguish "move" and "stay" from each other and detect them, but in the present embodiment, both are not distinguished from each other, and instead, "keep" is detected uniformly.

When the touch position signal 5A is not received for a time longer than the predetermined time Ta, and more specifically, when the touch position signal 5A is interrupted, the touch event reception unit 101 detects "release" as shown in FIG. 9C as a touch event.

When the touch position signal 5A of the press (more specifically, the first touch position signal 5A) is received by the touch event reception unit 101, the operation area determination unit 102 determines the type of area to which the touch position QT belongs, which is calculated based on the touch position signal 5A, on the basis of the screen data 5W of the current screen. More specifically, the operation area determination unit 102 determines the constituent element area to which the pixel of the touch position QT belongs on the current screen. Then, the operation area determination unit 102 determines the type of area which is set in the constituent element area (the simple operation area or the gesture area).

The touch response processing determination unit 103, the gesture determination unit 104, and the gesture response processing determination unit 105 performs the following processing in accordance with the result of the determination performed by the operation area determination unit 102.

When the constituent element area to which the pixel of the touch position QT belongs is determined to be the simple operation area, the touch response processing determination unit 103 determines processing which is to be executed as a response to the touch event performed by the user. Hereinafter this processing will be referred to as "touch response processing". The method of determination is the same as a conventional technique, but an example of method of determination will be hereinafter explained.

As described above, the touch event reception unit 101 detects, as a touch event, any one of "press", "keep", and "release". The touch response processing determination unit 103 determines processing in accordance with the pixel of the touch position QT and the detected touch event.

For example, in a case where an object including the pixel of the touch position QT is a close button 4A of the copy job screen 3C of FIG. 6 and the touch event is "press", then, processing for changing the form of the close button 4A (for example, changing the color to gray, and changing the shape to a depressed form) is determined to be the touch response processing. Thereafter, when "release" is done in any given position of the close button 4A, processing associated with the close button 4A in advance is determined to be the touch response processing, and more specifically, processing for closing the copy job screen 3C and displaying a previous screen are determined to be the touch response processing.

Alternatively, in a case where the object including the pixel of the touch position QT is the right scroll button 4B1 and the touch event is "press" or "keep", then, processing for scrolling the batch row 4L from the right to the left is determined to be the touch response processing.

On the other hand, when the constituent element area to which the pixel of the touch position QT belongs is determined to be the gesture area, the gesture determination unit 104 and the gesture response processing determination unit 105 perform the following processing.

The gesture determination unit 104 determines the gesture represented by the series of touch events on the basis of the touch events continuously detected by the touch event reception unit 101 and the touch position QT of each touch event, and determines the parameter 5C of the gesture. The determination and the method of determination are the same as the conventional techniques, but an example of methods will be hereinafter explained.

For example, when an operation of a combination of "press", "keep", and "release" is detected twice at the same touch position QT within a predetermined time Tb (for example, 0.5 seconds), then the gesture determination unit 104 determines that the gesture is a double tap. When an operation of a combination of "press", "keep", and "release" is detected once at the same touch position QT but no touch event is detected at the same touch position QT within the predetermined time Tb, then the gesture determination unit 104 determines that the gesture is a tap.

When the operation is fast, "keep" may not be detected. Therefore, when an operation of a combination of "press" and "release" is detected instead of the operation of the combination of "press", "keep", and "release", then the determination is made in a similar manner. When the number of times "keep" is continuously given is more than a predetermined number of times, the operation may be determined to be "long tap" instead of "tap". When a distance between two touch positions QT is within a predetermined range, both of the two touch positions QT may be determined to be the same.

Then, the gesture determination unit 104 determines that the touch position QT during "press" is a parameter 5C.

Alternatively, when the press is detected and thereafter "keep" is detected while the touch position QT moves at a speed equal to or more than a predetermined speed Sa in a constant direction, and thereafter "release" is detected, then the gesture determination unit 104 determines that the gesture is flick. Further, not only the touch position QT during "press" but also the speed, the time, and the direction are determined to be the parameter 5C. The speed, the time, and the direction are a speed, a time, and a direction when the entire screen or a portion of the screen is scrolled. The direction is represented by a vector based on position of "press" as a reference.

Alternatively, when "press" is detected and thereafter "keep" is detected while the touch position QT changes at a speed less than a predetermined speed Sa, then the gesture determination unit 104 determines that the gesture is drag (pan). Further, the touch position QT during "press" and the trace of the touch position QT are determined to be the parameter 5C. When operation that has nothing to do with drag is performed before "release", the drag may be treated as being cancelled. For example, when "touch" is performed at a position out of the trace of the touch position QT before "release", then the drag may be treated as being cancelled.

Alternatively, when "press" is detected at two touch positions QT and thereafter both of the touch position QT continue to move away from each other, then the gesture determination unit 104 determines that the gesture is pinch (zoom, pinch out). Further, not only a coordinate of a middle point of a line segment connecting both touch positions QT during "press" but also the speed, the time, and the direction of the pinch are determined to be the parameter 5C.

The gesture determination unit 104 may be constituted by a recognition unit provided for each gesture. For example, as shown in FIG. 10, the gesture determination unit 104 is constituted by a gesture manager 140, a tap recognition unit 141, a double tap recognition unit 142, a flick recognition unit 143, a drag recognition unit 144, and a pinch recognition unit 145. Every time the touch event reception unit 101 detects the touch event and calculates the touch position QT, information thereabout is input into each of the recognition units 141 to 145. Then, each of the recognition units 141 to 145 recognizes whether the gesture associated therewith is done or not on the basis of the information. For example, the tap recognition unit 141 recognizes whether "tap" is performed or not, and the pinch recognition unit 145 recognizes whether "pinch" is performed or not. When it is determined to be performed, a notification to that effect is given to the gesture manager 140. The gesture manager 140 determines the gesture on the basis of the notification given by each of the recognition units 141 to 145.

A gesture recognizer prepared in advance in the operating system of the image forming apparatus 1 may be used as each recognition unit. In this case, the parameter 5C of each gesture is determined in accordance with the specification of the operating system.

The gesture response processing determination unit 105 determines processing to be executed as a response to the gesture performed by the user. Hereinafter, this processing will be referred to as "gesture response processing". The method of determination is the same as the conventional techniques, but an example of methods of determination will be hereinafter explained.

For example, when flick is performed on any given optional function badge 4C of the copy job screen 3C of FIG. 6, the gesture response processing determination unit 105 determines that the processing for scrolling the batch row 4L according to the parameter 5C is the touch response processing.

Alternatively, when double tap is performed on the optional function badge 4Cs, the gesture response processing determination unit 105 determines that the processing for changing the mode of the optional function badge 4Cs to a mode representing ON and updating the setting value indicating presence/absence of application of watermark to set the setting value to ON is the touch response processing.

Every time the key (hard key) is pressed down, the hard key panel 10k1 outputs a press-down key signal 5D indicating the key to the main CPU 10a. Then, the hard key operation reception unit 106 and the hard key response processing determination unit 107 perform the following processing.

The hard key operation reception unit 106 receives the press-down key signal 5D. The hard key response processing determination unit 107 determines processing to be executed as a response to operation performed by the user with the hard key panel 10k1 on the basis of the current screen and the press-down key signal 5D. Hereinafter, this processing will be referred to as "hard key response processing". The method of determination is the same as the conventional techniques, but an example of methods of determination will be hereinafter explained.

For example, when the function key 1kf1 (see FIG. 4) is pressed down while any given screen is displayed, the processing for displaying the facsimile transmission job screen 3F shown in FIG. 11A is determined to be the hard key response processing.

Alternatively, in a case where a facsimile number is input with the numeric keys 1kt when the facsimile transmission job screen 3F is the current screen, then the processing for receiving the facsimile number as a transmission destination and reflecting it on the facsimile transmission job screen 3F as shown in FIG. 11B are determined to be the hard key response processing.

Every time the touch response processing determination unit 103 determines touch response processing, or the gesture response processing determination unit 105 determines gesture response processing, or the hard key response processing determination unit 107 determines hard key response processing, then the screen control unit 108 controls each hardware so as to execute the touch response processing, the gesture response processing, or the hard key response processing determined. Hereinafter, the touch response processing, the gesture response processing, and the hard key response processing will be collectively referred to as "response processing".

The response processing can be done via an API (Application Program Interface) as did in the past.

In addition, the screen control unit 108 controls the liquid crystal display 10k2 so as to display a message window in response to a notification given by the operating system.

[Processing for Recording Operation]

FIG. 12 is a figure illustrating an example of operation log data 5F.

The user presses the start end command key 1kf2 to input a command of start of recording, the operation log data generation unit 121 and the operation log data storage unit 122 of FIG. 8 perform the following processing to record a log of operation performed with the operation panel unit 10k.

The user causes the liquid crystal display 10k2 to display a screen for performing the first operation of the series of operations to be played back later. then, the user presses the start end command key 1kf2 to start the series of operations.

Like the case of the normal mode, the touch event reception unit 101 to the screen control unit 108 performs processing according to the series of operations according to the above method.

Further, the operation log data generation unit 121 executes, as follows, the processing for generating the operation log data 5F shown in FIG. 12.

The operation log data generation unit 121 prepares vacant operation log data 5F. When operation is performed on the simple operation area, a record for each touch event detected by the touch event reception unit 101 is added to the operation log data 5F.

In the record, "touch" is indicated as the "operation type", and the touch event and touch position QT detected by the touch event reception unit 101 is indicated as the "operation content". Further, a time from when an immediately before (previous) touch event, gesture, or press-down key signal 5D is detected or received to when a touch event in question is detected is displayed as an elapsed time Tr.

Alternatively, when an operation is performed on the gesture area, the operation log data generation unit 121 adds a record of gesture determined by the gesture determination unit 104 to the operation log data 5F.

In this record, the "gesture" is indicated as the "operation type". The type of gesture detected by the gesture determination unit 104 (tap, double tap, flick, drag, pinch, or the like) and the calculated parameter 5C are indicated as the "operation content", and in addition, a time from when an immediately before (previous) gesture, press-down key signal 5D, or the last touch event on the simple operation area is detected or received to when the first touch event related to this gesture is detected is indicated as the elapsed time Tr.

Alternatively, when an operation for any one of the keys in the hard key panel 10k1 is performed, the operation log data generation unit 121 adds the record of this key to the operation log data 5F.

In this record, the "key press-down" is indicated as the "operation type", and the press-down key signal 5D (pressed hard key) is indicated as the "operation content". Further, a time from when an immediately before (previous) gesture, press-down key signal 5D, or the last touch event on the simple operation area is detected or received to when this press-down key signal 5D is received is indicated as the elapsed time Tr.

Until an end command is input, the operation log data generation unit 121 adds a record according to operation to the operation log data 5F in accordance with the above method every time an operation is performed. Further, the operation log data generation unit 121 associates, with the operation log data 5F, an identifier of a screen displayed on the liquid crystal display 10k2 when a start command is input (hereinafter referred to as "start-time screen identifier").

In a case of the first record, a time that has passed since a start command is input is indicated as the elapsed time Tr.

[Processing for Playing Back Operation]

Figure 13:
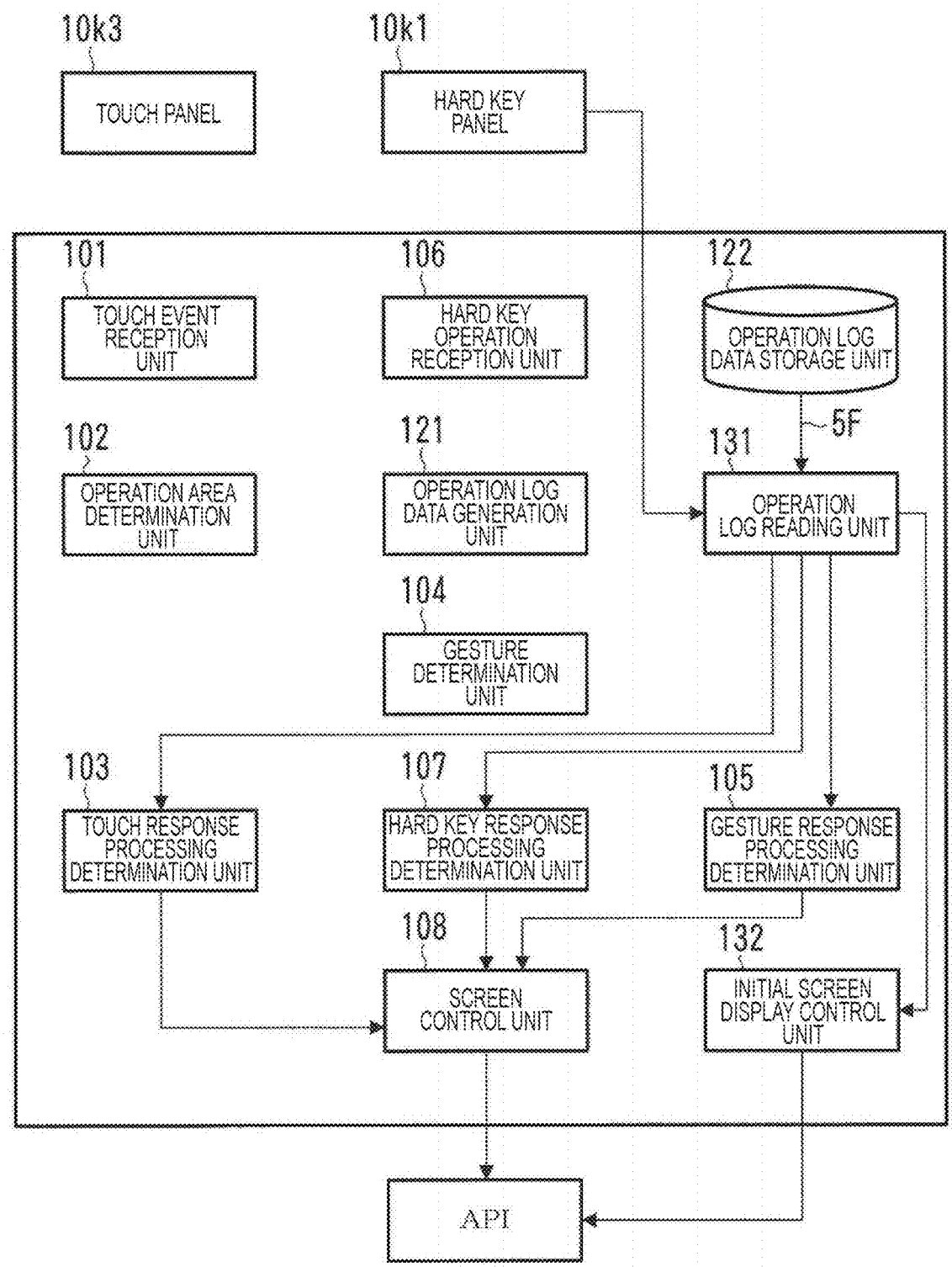
FIG. 13 is a figure illustrating an example of functional configuration of an image forming apparatus and an example of a flow of data when operation is played back.
Figure 14:
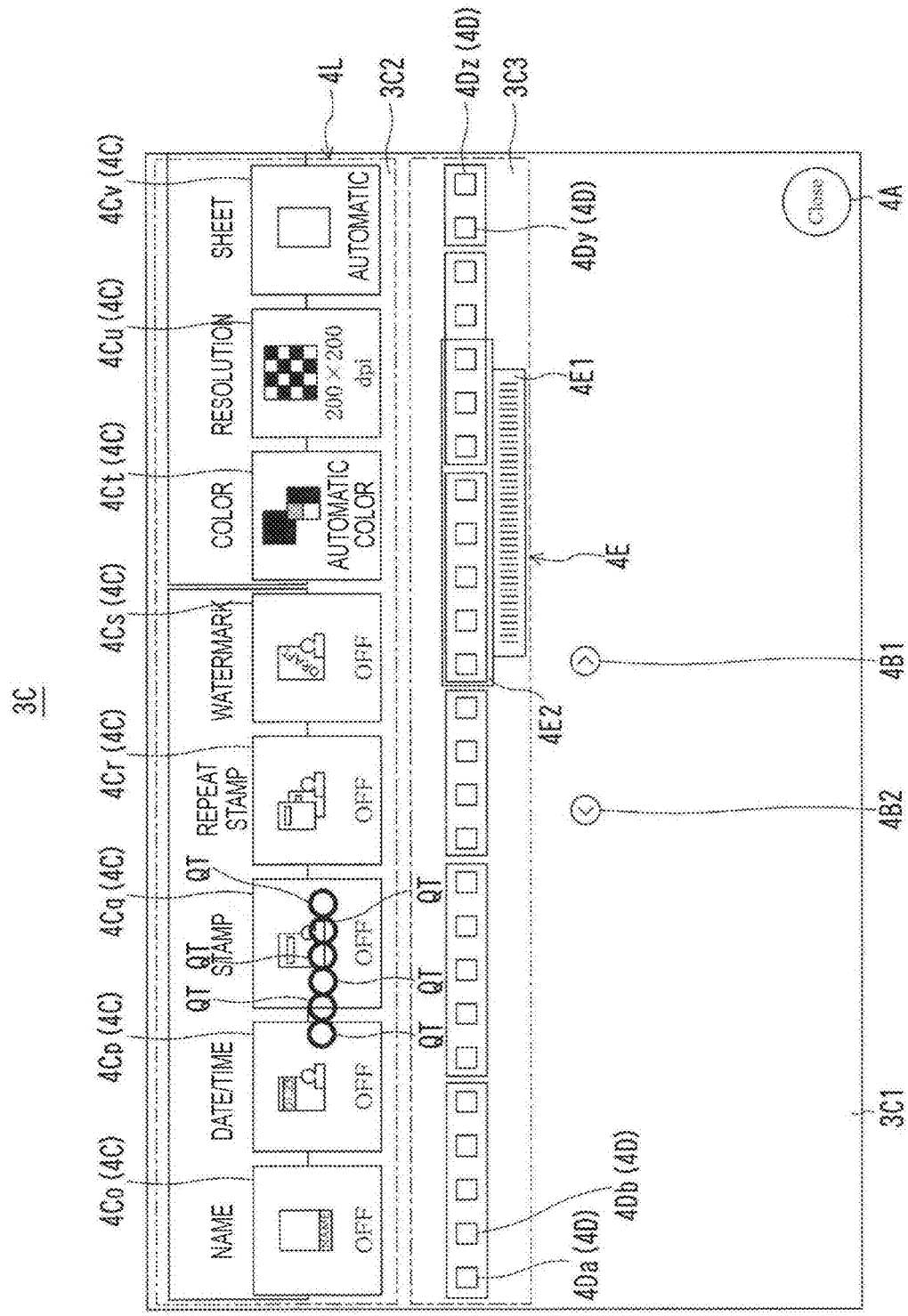
FIG. 14 is a figure illustrating an example of a trace of a flick.
Figure 15:
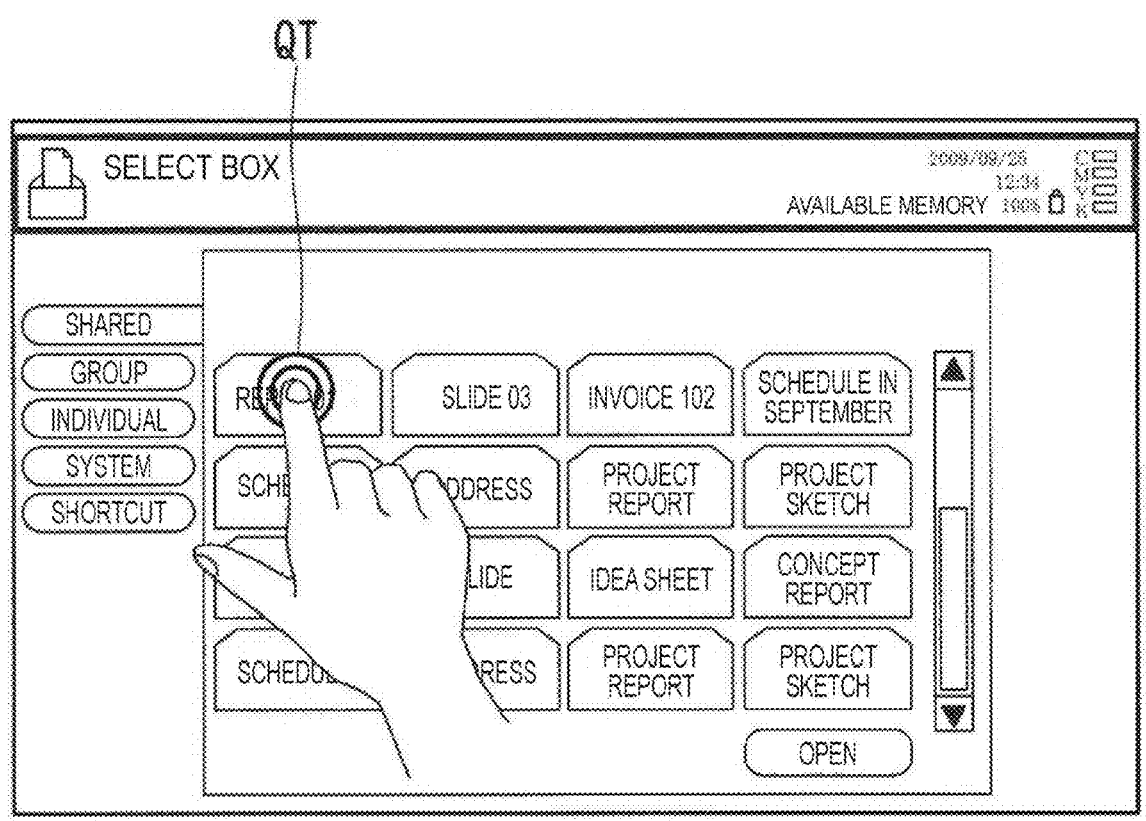
FIG. 15 is a figure illustrating an example of a trace of a double tap.
Figure 16A:
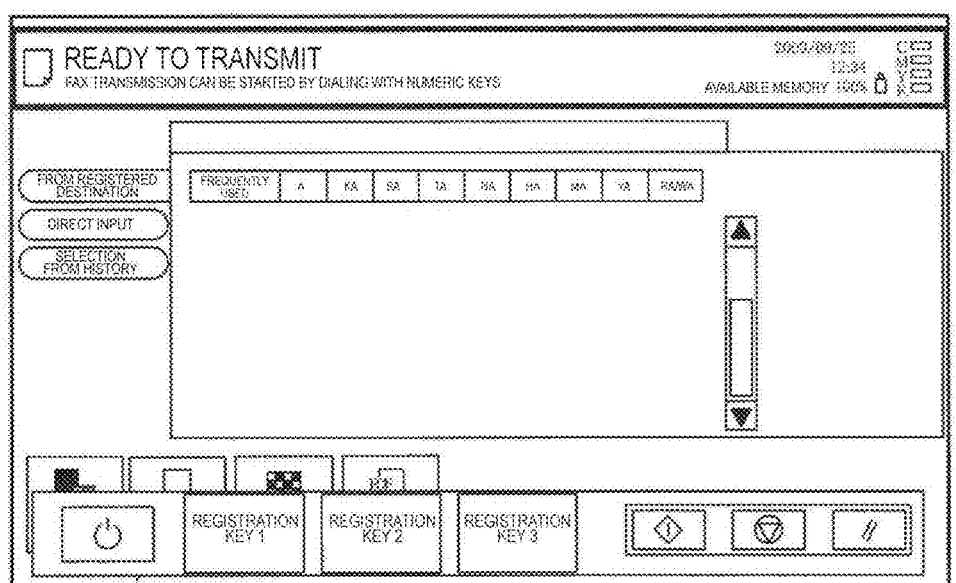
FIGS. 16A and 16B are figures illustrating an example of a hard key panel lower-side image and a hard key panel right-side image.
Figure 16B:
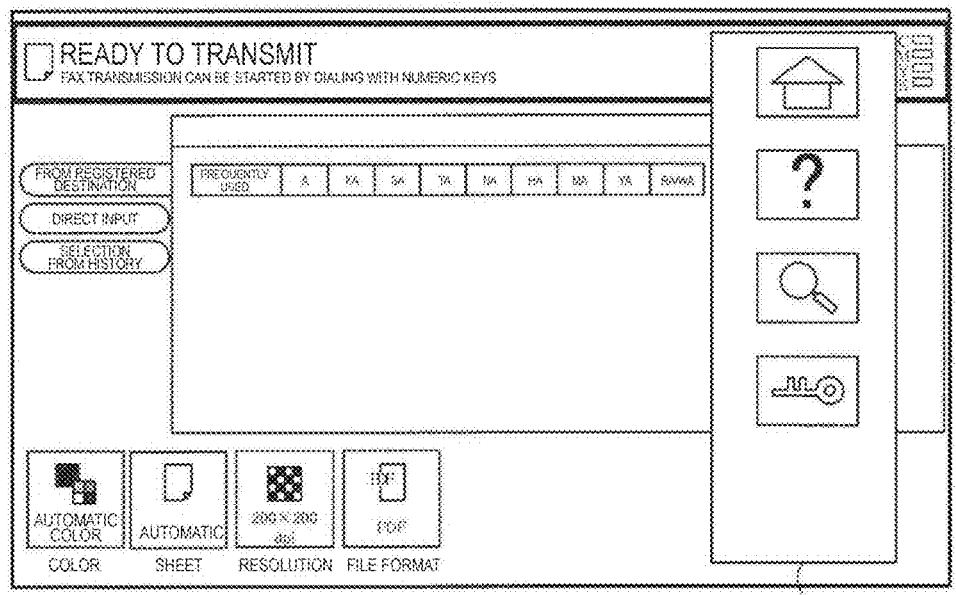

FIG. 13 is a figure illustrating an example of a functional configuration of the image forming apparatus 1 and an example of flow of data when operation is played back. FIG. 14 is a figure illustrating an example of trace of flick. FIG. 15 is a figure illustrating an example of trace of double tap. FIGS. 16A and 16B are figures illustrating an example of a hard key panel lower-side image 3HK1 and a hard key panel right-side image 3HK2.

When the user inputs a command of play back of operation (hereinafter referred to as "play back command"), the operation log reading unit 131 and the initial screen display control unit 132 of FIG. 8 execute processing for playing back the series of operations that the user did in the past while cooperating with the touch response processing determination unit 103, the gesture response processing determination unit 105, the hard key response processing determination unit 107, and the screen control unit 108. Hereinafter this processing will be explained with reference to FIG. 13.

When a play back command is input, the operation log reading unit 131 switches the image forming apparatus 1 from the normal mode to the play back mode, and reads the operation log data 5F from the operation log data storage unit 122.

Then, the operation log reading unit 131 gives the start-time screen identifier attached to the operation log data 5F to the initial screen display control unit 132.

Then, the initial screen display control unit 132 controls the liquid crystal display 10k2 to display the screen of this start-time screen identifier.

The operation log reading unit 131 also gives, as described below, the record of the operation log data 5F to any one of the touch response processing determination unit 103, the gesture response processing determination unit 105, and the hard key response processing determination unit 107, which are arranged to the upper side. Then, the touch response processing determination unit 103, the gesture response processing determination unit 105, and the hard key response processing determination unit 107 performs processing as follows.

The record including "touch" as the operation type is given to the touch response processing determination unit 103. Then, the touch response processing determination unit 103 determines touch response processing in accordance with the pixel of the touch position QT and the touch event shown in this record.

The record including "gesture" as the operation type is given to gesture response processing determination unit 105. Then, the gesture response processing determination unit 105 determines the gesture response processing in accordance with the gesture and the parameter 5C shown in this record.

The record including "key press-down" as the operation type is given to the hard key response processing determination unit 107. Then, the hard key response processing determination unit 107 determines hard key response processing in accordance with the press-down key signal 5D indicated in this record.

It should be noted that a point in time when the record is given to each unit is in accordance with the elapsed time Tr shown in each record. More specifically, the first record is given at a point in time when the elapsed time Tr shown in this record passes since the play back command is input. The N-th (N≥2) record is given at a point in time when the elapsed time Tr indicated in the N-th record passes since the (N−1)-th record is given. The method of determining each response processing is similar to the case of the normal mode, and is as explained above.

Then, like the case of the normal mode, every time the touch response processing determination unit 103, the gesture response processing determination unit 105, or the hard key response processing determination unit 107 determines the response processing, the screen control unit 108 controls each hardware so as to execute the response processing.

As described above, when the operation is played back on the basis of the operation log data 5F, the screen changes. The user can guess what kind of operation has been performed by seeing this.

In order to allow the user to guess it still more easily, the screen control unit 108 may display a mark representing the touch position QT which overlaps on the screen. For example, as shown in FIG. 14, marks representing all or a portion of the touch positions QT during flick operation may be displayed as a trace. Therefore, the user can easily guess the strength of flick.

The mode of the mark representing the touch position QT may be changed in accordance with the gesture determined by the gesture determination unit 104. For example, in a case of flick operation, the screen control unit 108 displays a perfect circle of a thick line as a mark representing the touch position QT as shown in FIG. 14. In a case of drag operation, a triangle of a dotted line is displayed.

Alternatively, in a case of double tap, the screen control unit 108 displays a double circle as shown in FIG. 15. An inner circle may be displayed during the first tap (a series of touch operation from pressing to releasing), and an outer circle may be displayed during the second tap.

In some cases, the user is unable to find which key has been pressed even if the operation on the hard key panel 10k1 is played back. Therefore, the screen control unit 108 may display the image of the hard key panel 10k1 which overlaps on the screen, and may display the mark on the pressed key. Instead of displaying the entire portion of the image of the hard key panel 10k1, a portion of the image may be displayed. Instead of displaying the image at all times, the image may be displayed when the operation is performed on the hard key panel 10k1 and thereafter the image may be closed.

For example, in a predetermined period of time including a point in time when the function key 1kf1 is touched, as shown in FIG. 16A, the screen control unit 108 displays a hard key panel lower-side screen 3HK1 representing the lower side of the hard key panel 10k1. Then, a predetermined mark (for example, star shaped mark) is displayed on the image of the function key 1kf1. Likewise, when the function key 1kf4 is displayed on the operation log data 5F, the hard key panel right-side screen 3HK2 is displayed as shown in FIG. 16B. Then, a predetermined mark is displayed on the image of the function key 1kf4.

Figure 17:
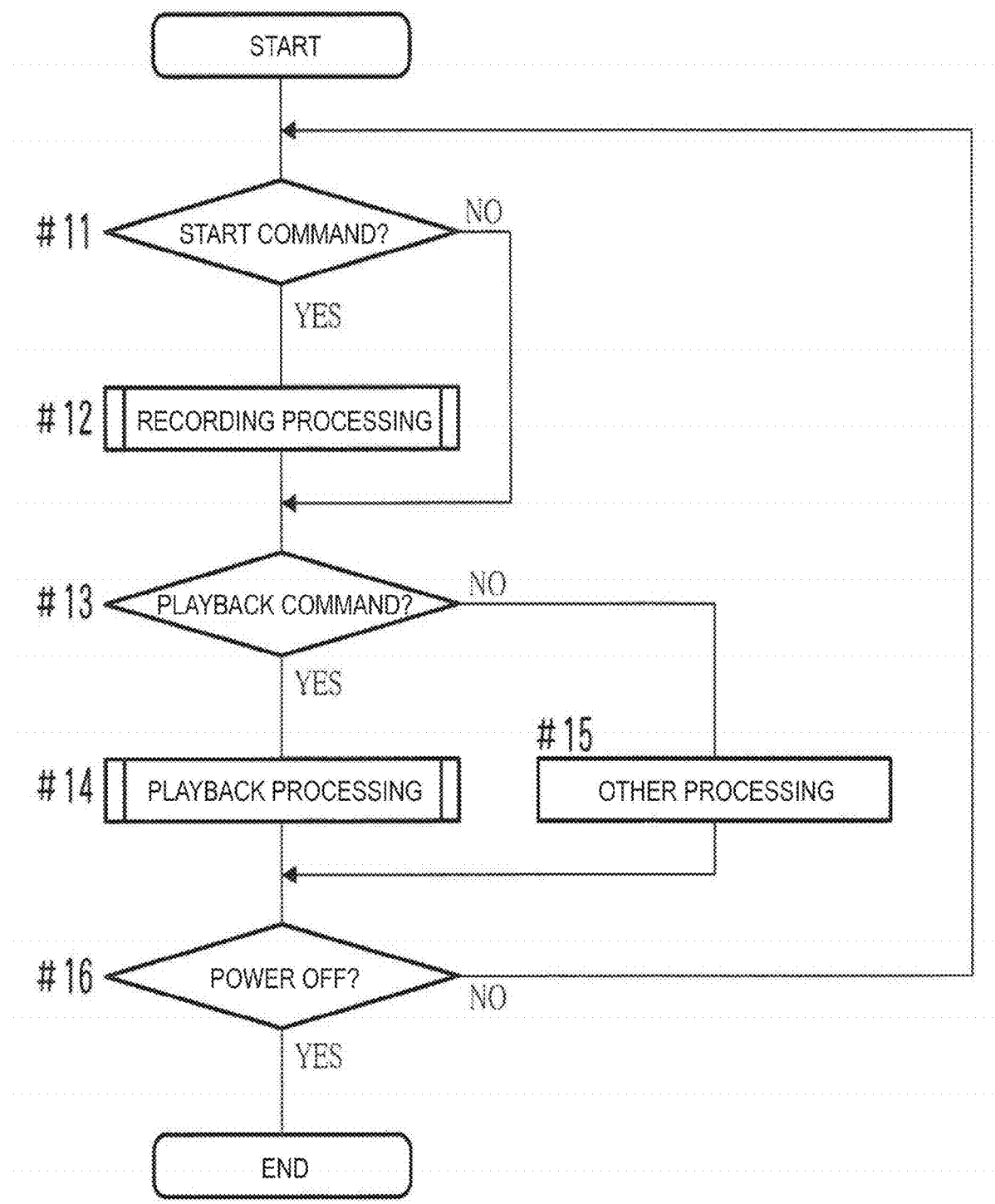
FIG. 17 is a flowchart for explaining an example of a flow of overall processing of an image forming apparatus.
Figure 18:
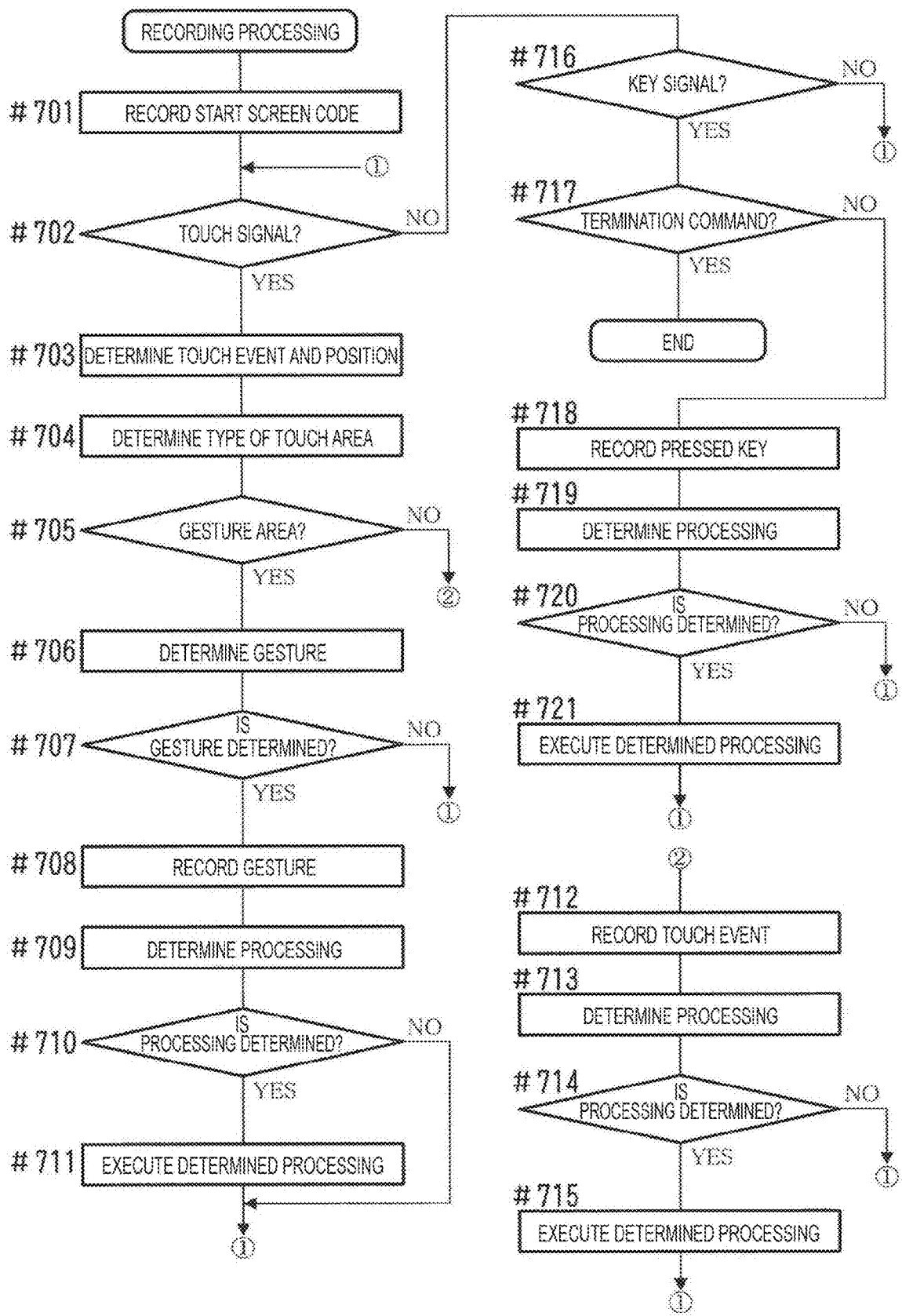
FIG. 18 is a flowchart for explaining an example of a flow of recording processing.
Figure 19:
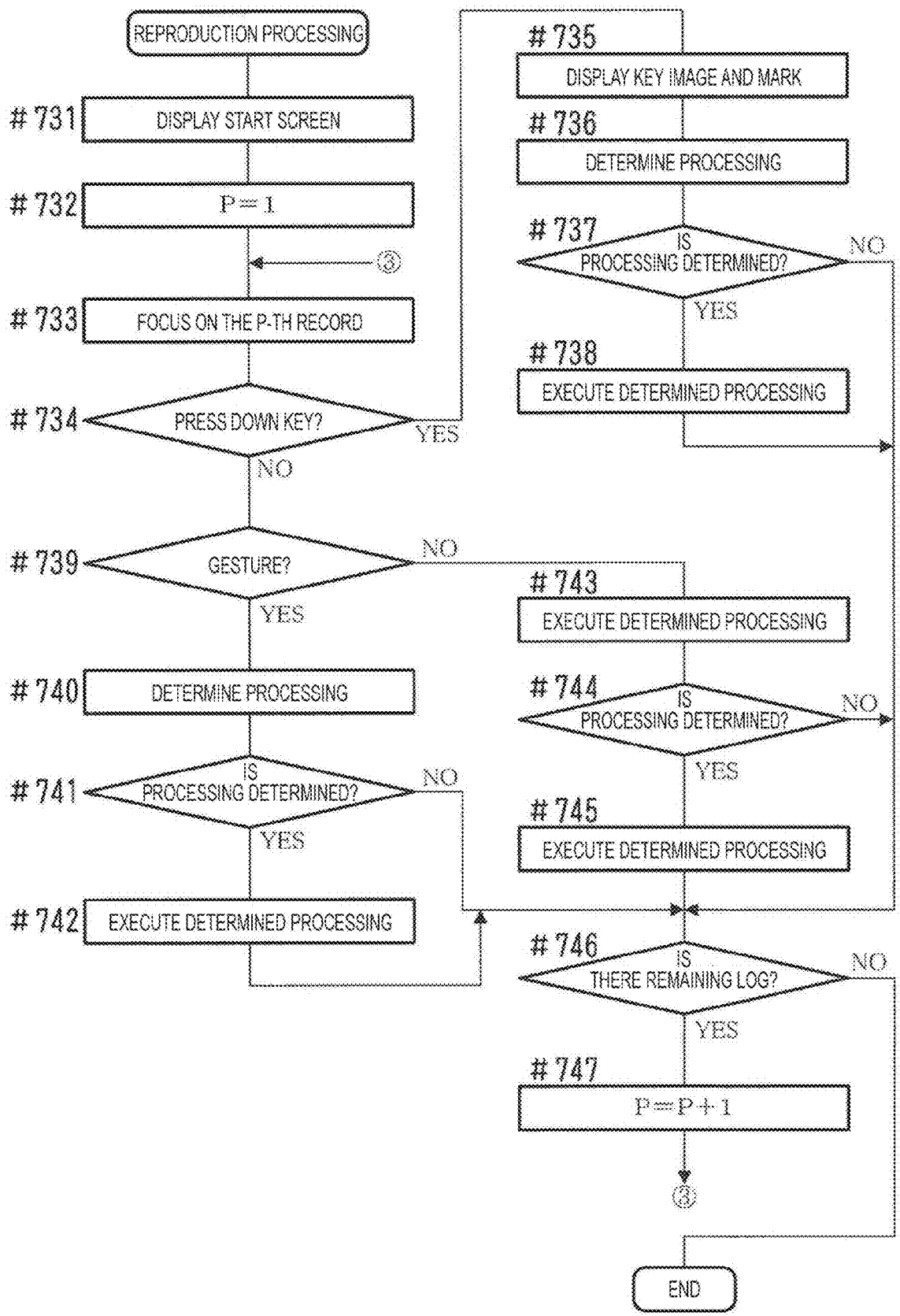
FIG. 19 is a flowchart for explaining an example of a flow of play back processing.

FIG. 17 is a flowchart for explaining an example of a flow of entire processing of the image forming apparatus 1. FIG. 18 is a flowchart for explaining an example of a flow of recording processing. FIG. 19 is a flowchart for explaining an example of a flow of play back processing.

Subsequently, a flow of entire processing of display performed by the image forming apparatus 1 will be explained with reference to FIG. 17 to FIG. 19 and the like.

While the power is ON, the image forming apparatus 1 executes processing as shown in FIG. 17 in response to user operation performed with the operation panel unit 10k.

More specifically, when a start command is input (Yes in #11), the image forming apparatus 1 executes processing for recording a log of operation in accordance with the procedure as shown in FIG. 18 (#12).

In FIG. 18, the image forming apparatus 1 generates blank operation log data 5F, and associates the start-time screen identifier of the current screen (#701).

In a case where the touch position signal 5A is received by the touch panel 10k3 (Yes in #702), the image forming apparatus 1 calculates the touch position QT and determines the touch event (#703). Further, the type of area to which the touch position QT belongs (the simple operation area or the gesture area) is determined (#704).

When this type of area is the gesture area (Yes in #705), the image forming apparatus 1 tries to determine the gesture performed by the user (#706). However, the gesture is achieved by a combination of multiple touches, and therefore, it may be impossible to determine the gesture. When the image forming apparatus 1 can determine the gesture (Yes in #707), the image forming apparatus 1 adds a record indicating the determination result and the elapsed time Tr and having "gesture" as the operation type to the operation log data 5F (#708), and the image forming apparatus 1 tries to determine the processing to be executed in accordance with the gesture (#709). Then, when the processing can be determined (Yes in #710), this processing is executed (#711).

On the other hand, when this type of area is the simple operation area (No in #705), the image forming apparatus 1 adds, to the operation log data 5F, a record indicating the touch position QT calculated in step #703 and indicating the detected touch event and the elapsed time Tr and including "touch" as the operation type (#712), and tries to determine processing to be executed according to this touch event (#713). Then, when the processing can be determined (Yes in #714), this processing is executed (#715).

Alternatively, when the press-down key signal 5D is received by the hard key panel 10k1 (No in #702, Yes in #716), and when the start end command key 1kf2 is not indicated in this press-down key signal 5D (No in #717), the image forming apparatus 1 adds, to the operation log data 5F, a record indicating the press-down key signal 5D and the elapsed time Tr and including "key press-down" as the operation type (#718). The image forming apparatus 1 tries to determine the processing to be executed in response to pressing-down of this key (#719). Then, when the processing can be determined (Yes in #720), this processing is executed (#721).

Until the start end command key 1kf2 is pressed, the image forming apparatus 1 executes processing in steps #702 to #721 as necessary.

Then, when the image forming apparatus 1 receives the press-down key signal 5D indicating the start end command key 1kf2 (Yes in #717), the image forming apparatus 1 terminates the processing for recording a log of operation.

Back to FIG. 17, when the image forming apparatus 1 inputs a play back command (Yes in #13), the image forming apparatus 1 executes processing for playing back user's operation in accordance with the procedure as shown in FIG. 19 on the basis of the operation log data 5F (#14).

The image forming apparatus 1 reads the operation log data 5F, and displays the screen of the start-time screen identifier associated with the operation log data 5F (#731 of FIG. 19)

The image forming apparatus 1 focuses on the first record on the operation log data 5F (#732, #733).

When "press-down key" is indicated as the operation type in the focused record (Yes in #734), as explained with reference to FIGS. 16A and 16B, the image forming apparatus 1 displays the image of the hard key panel 10k1 which overlaps the current screen, and displays a mark with a key associated with the press-down key signal 5D indicated by the record (#735). Then, the image forming apparatus 1 tries to determine the hard key response processing to be executed in response to the pressing-down of the key (#736). When the hard key response processing can be determined (Yes in #737), this is executed (#738).

Alternatively, when "gesture" is indicated as the operation type in the focused record (No in #734, Yes in #739), the image forming apparatus 1 tries to determine the gesture response processing to be executed in response to the operation content indicated in this record (#740). When the gesture response processing can be determined (Yes in #741), this is executed (#742).

Alternatively, when "touch" is indicated as the operation type in the focused record (No in #734, No in #739), the image forming apparatus 1 tries to determine the touch response processing to be executed in response to the operation content indicated in this record (#743). When this touch response processing can be determined (Yes in #744), this is executed (#745).

When there is still a not-focused record in the operation log data 5F (Yes in #746), the image forming apparatus 1 return back to step #733 to focus the top record among these records, and executes the processing in steps #734 to #745 as necessary.

Back to FIG. 17, when the image forming apparatus 1 receives, e.g., commands for those other than recording and play-back of operations (No in #13), the image forming apparatus 1 executes processing based on this command and the like as has been done in the past (#15).

The operation log data 5F may be copied via a server or portable recording medium (for example, a USB memory) to another image forming apparatus 1, and the another image forming apparatus 1 may play back the operation on the basis of the operation log data 5F. For example, a generating person uses an image forming apparatus 1A in an office of a manufacturer generates the operation log data 5F as a manual, and distributes the operation log data 5F to a service engineer in training. The service engineer copies the operation log data 5F to the operation log data storage unit 122 of the image forming apparatus 1B (see FIG. 8, FIG. 13). The service engineer inputs the play back command, so that the operation is played back. Then, the service engineer sees the screen displaying at this occasion, so that the service engineer finds how to perform operation.

Hereinafter explained is operation, processing, and transition of a screens in a case where the operation log data 5F is generated by the image forming apparatus 1A and used by the image forming apparatus 1B, and this will be explained using an example where the binding margin of a copied material is set to "bind left-side".

[During Generation]

FIGS. 20A to 22C are figures illustrating an example of transition of a screen and user's operation when the operation log data 5F are generated. FIG. 23 is a figure illustrating an example of the operation log data 5F.

Figure 20A:
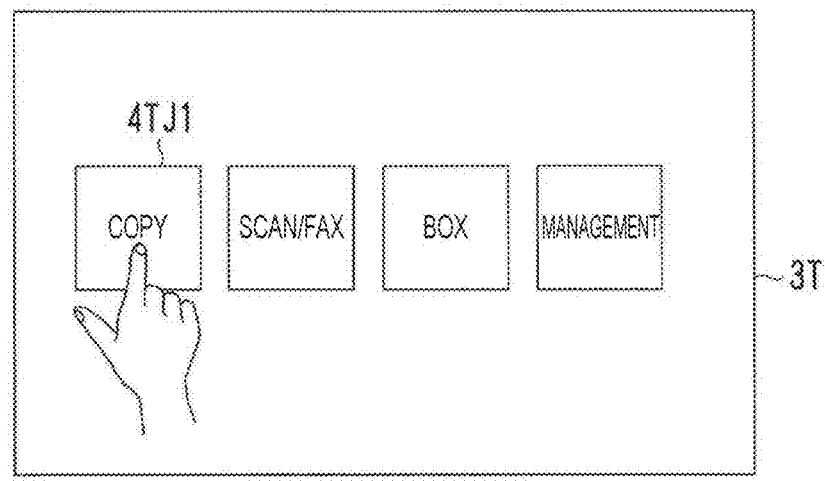
FIGS. 20A to 20C are figures illustrating an example of transition of a screen and operation performed by a user when operation log data are generated.

When the home screen 3T of FIG. 20A is displayed, a generating person who makes a manual for operation inputs a start command by pressing the start end command key 1kf2 of the image forming apparatus 1A (see FIG. 4). It should be noted that the entire home screen 3T is the simple operation area.

Then, the image forming apparatus 1A starts recording operation performed on the hard key panel 10k1 or the touch panel 10k3. It should be noted that the procedure of recording is what has been explained with reference to FIG. 18 above. In this example, first, the image forming apparatus 1A prepares blank operation log data 5F, and thereafter, writes the content of operation to the operation log data 5F in order.

Figure 20B:
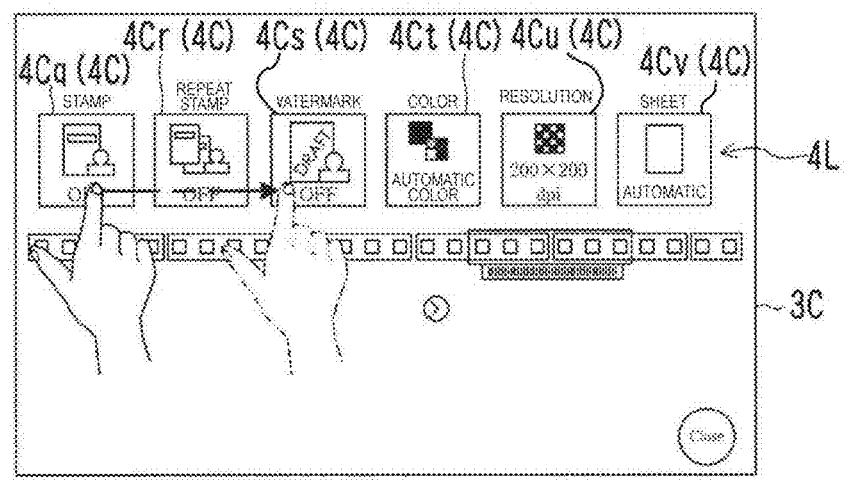

The generating person taps the copy button 4TJ1 from the home screen 3T. Then, the image forming apparatus 1A adds the records 5Fa1 to 5Fa4 as shown in FIG. 23 to the operation log data 5F as a record at each time while the generating person taps (touches) the copy button 4TJ1. Further, instead of the home screen 3T, the copy job screen 3C shown in FIG. 20B is displayed.

Figure 20C:
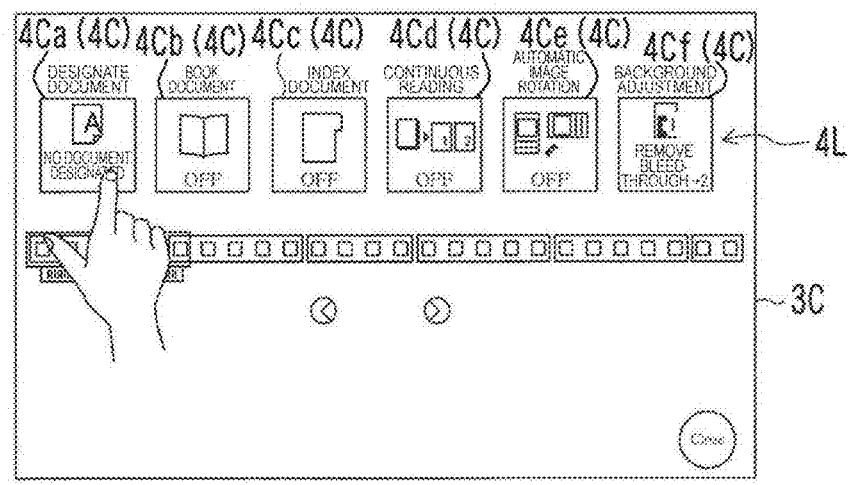

The generating person flicks the batch row 4L from the left to the right. The batch row 4L belongs to the gesture area, and therefore, the image forming apparatus 1A adds a record 5Fb, as a record of this flick, to the operation log data 5F. Further, the batch row 4L is scrolled. Therefore, the batch row 4L changes as shown in FIG. 20C.

Figure 21A:
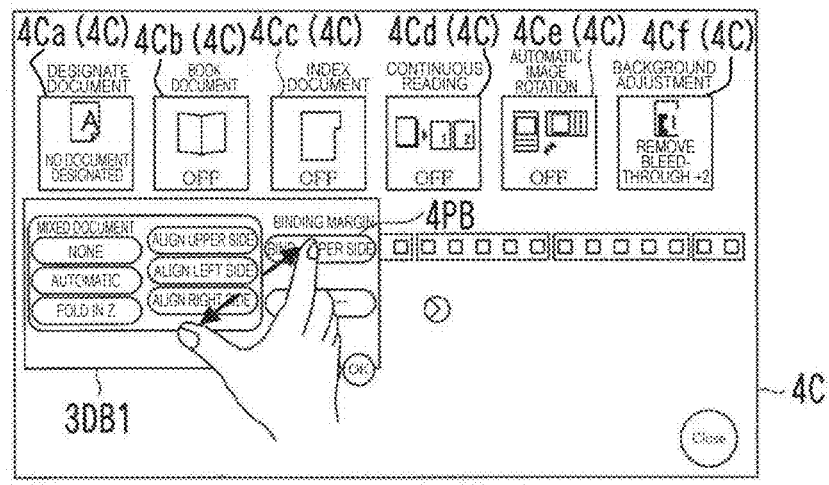
FIGS. 21A to 21C are figures illustrating an example of transition of a screen and operation performed by a user when operation log data are generated.

The generating person double taps the optional function badge 4Ca. Then, the image forming apparatus 1A adds a record 5Fc, as a record of this double tap, to the operation log data 5F. Further, the dialog box 3DB1 is displayed on the copy job screen 3C as shown in FIG. 21A.

Figure 21B:
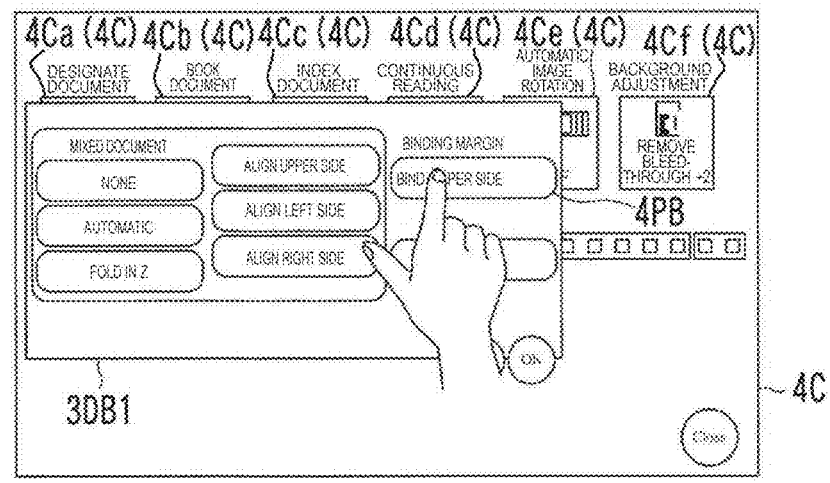

In order to make the dialog box 3DB1 easy to see, the generating person pinches the dialog box 3DB1 at any position. Then, the image forming apparatus 1A adds a record 5Fd, as a record of this pinch, to the operation log data 5F. Further, the dialog box 3DB1 is enlarged as shown in FIG. 21B. It should be noted that the entire dialog box 3DB1 is the gesture area.

Figure 21C:
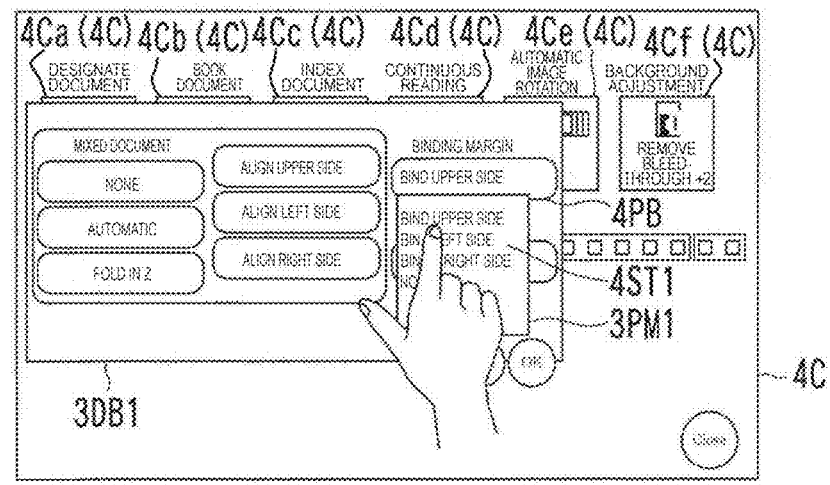

The generating person taps a pull-down button 4PB. Then, the image forming apparatus 1 adds a record 5Fe, as a record of this tap, to the operation log data 5F. Further, as shown in FIG. 21C, a pull-down menu 3PM1 is displayed on the dialog box 3DB1.

Figure 22A:
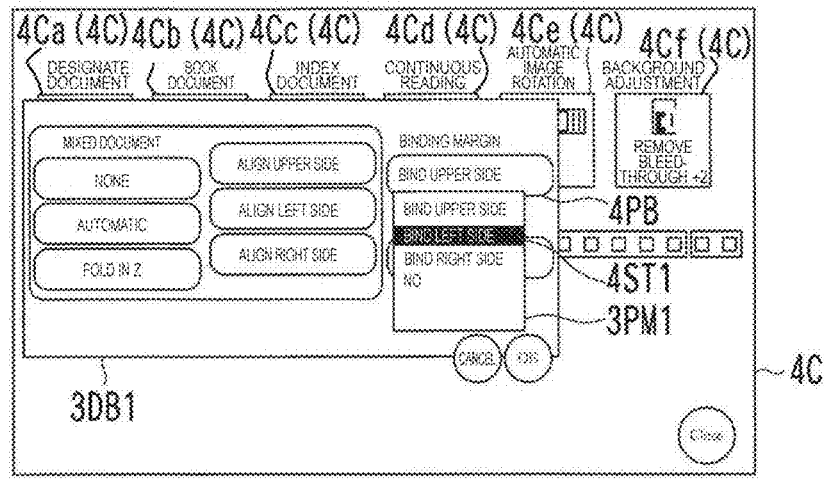
FIGS. 22A to 22C are figures illustrating an example of transition of a screen and operation performed by a user when operation log data are generated.
Figure 22B:
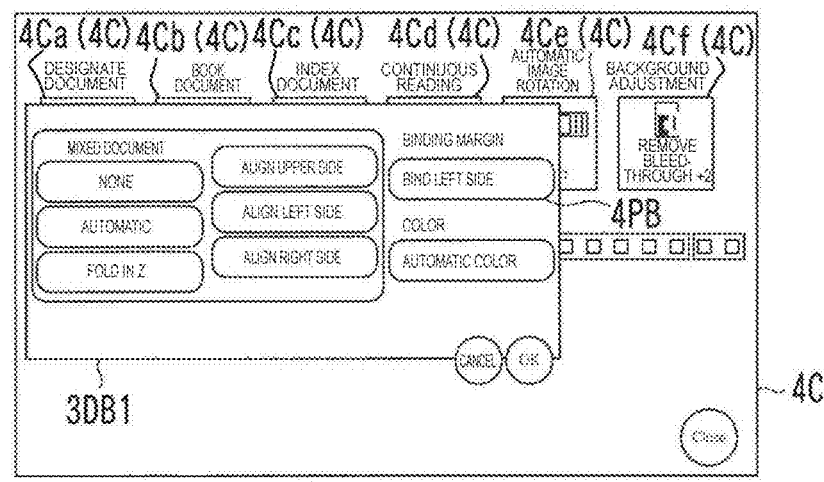

The generating person taps a selection option 4ST1 corresponding to "bind left side" from the pull-down menu 3PM1. Then, the image forming apparatus 1 adds a record 5Ff, as a record of this tap, to the operation log data 5F. Further, as shown in FIG. 22A, the selection option 4ST1 is changed to a mode indicating the selected state (a mode in which the color of character and the color of background are reversed in this example). Then, when a predetermined time (for example, 0.5 seconds) passes after the tap, the pull-down menu 3PM1 is closed as shown in FIG. 22B, and the binding margin of the copied material is set to "bind left side".

Figure 22C:
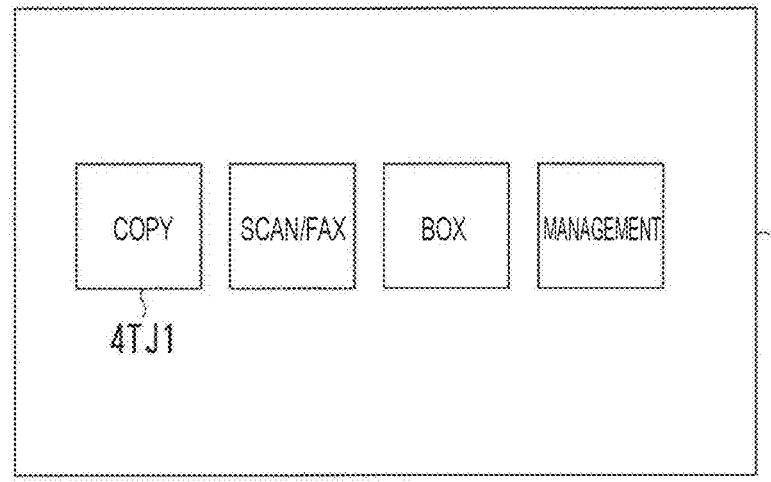

The generating person presses the function key 1$kf$4 of the hard key panel 10$k$1. It should be noted that the function key 1$kf$4 is a key for returning back to the home screen 3T. Then, the image forming apparatus 1 adds a record 5Fg, as a record of pressing down of this key, to the operation log data 5F. Further, the copy job screen 3C is closed, and the home screen 3T is displayed again as shown in FIG. 22C.

Then, the generating person inputs an end command by pressing the start end command key 1$kf$2. Then, the image forming apparatus 1 terminates the processing of recording. The image forming apparatus 1 associates the current screen displayed when the start command is input with the operation log data 5F. More specifically, the image forming apparatus 1 associates the identifier of the home screen 3T as the start-time screen identifier.

According to the operation and the processing explained above, recording is completed, which means that the generation of the operation log data 5F is completed.

Then, the generating person copies the operation log data 5F to the portable recording medium, and gives the operation log data 5F to the service engineer.

[During Play Back]

FIGS. 24A to 27C are figures illustrating an example of transition of a screen when operation is played back.

The service engineer sets the portable recording medium to the image forming apparatus 1B, and copies the operation log data 5F to the operation log data storage unit 122. Then, the play back command is input. Then, the image forming apparatus 1B performs processing as follows on the basis of each record of the operation log data 5F.

Figure 24A:
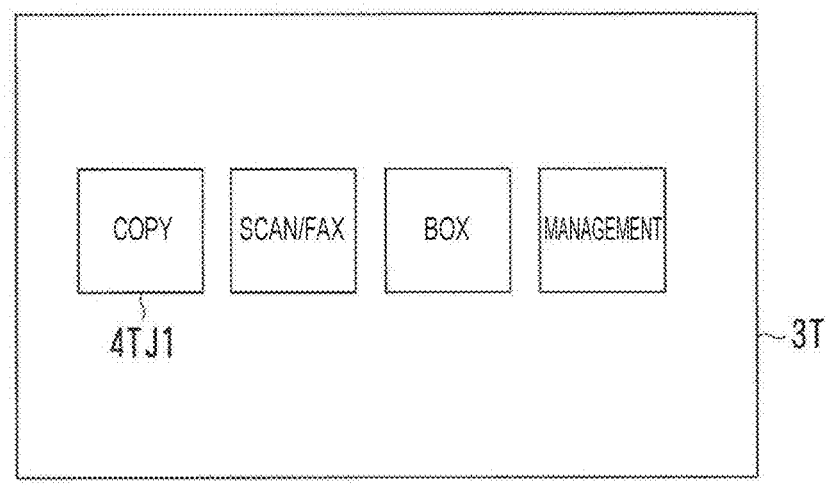
FIGS. 24A to 24C are figures illustrating an example of transition of a screen when operation is played back.
Figure 24B:
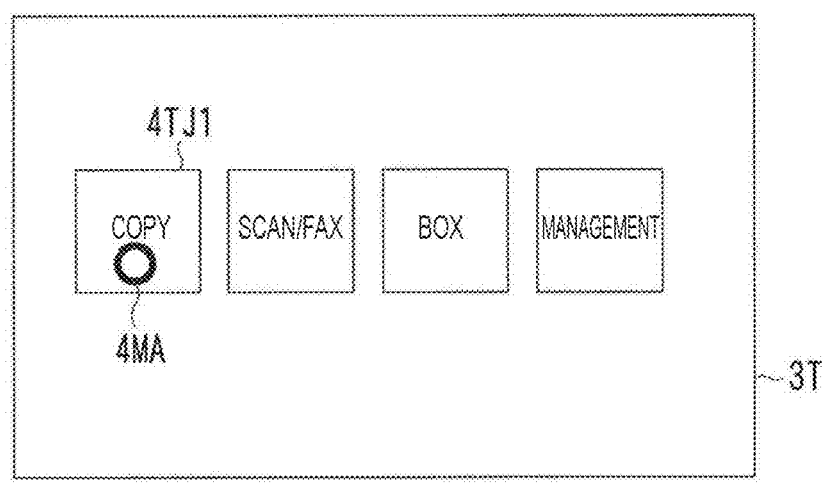
Figure 24C:
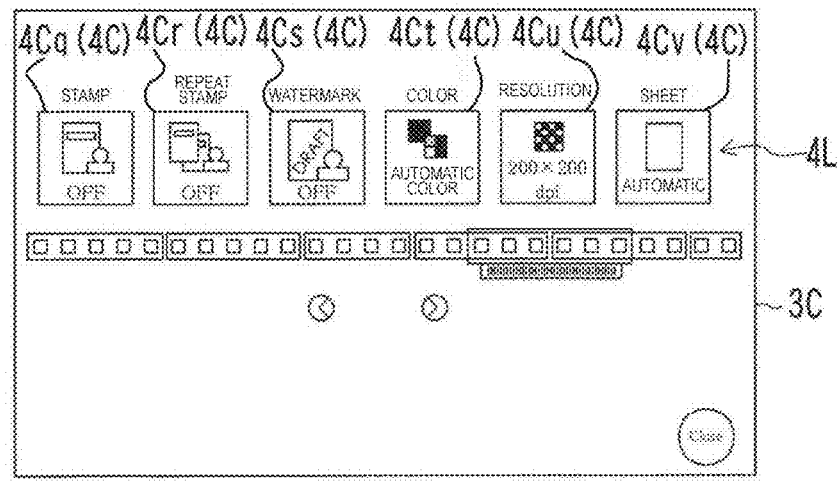

The image forming apparatus 1B displays the home screen 3T as shown in FIG. 24A in accordance with the start-time screen identifier associated with the operation log data 5F. On the basis of the records 5Fa1 to 5Fad in the operation log data 5F (see FIG. 23), the image forming apparatus 1B displays a mark 4MA representing tap on the copy button 4TJ1 as shown in FIG. 24B, and displays the copy job screen 3C instead of the home screen 3T as shown in FIG. 24C.

Figure 25A:
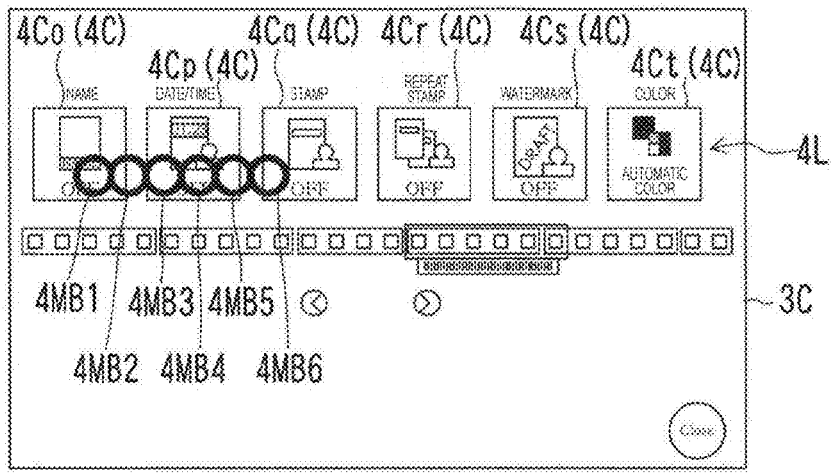
FIGS. 25A to 25C are figures illustrating an example of transition of a screen when operation is played back.

The image forming apparatus 1B scrolls the batch row 4L while displaying marks 4MB1 to 4MB6 corresponding to the flicked touch position QT as shown in FIG. 25A on the basis of the record 5Fb.

Figure 25B:
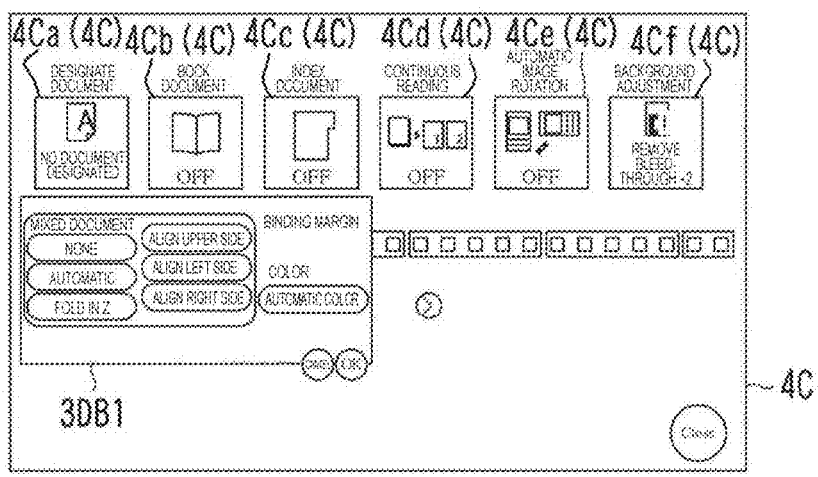
Figure 25C:
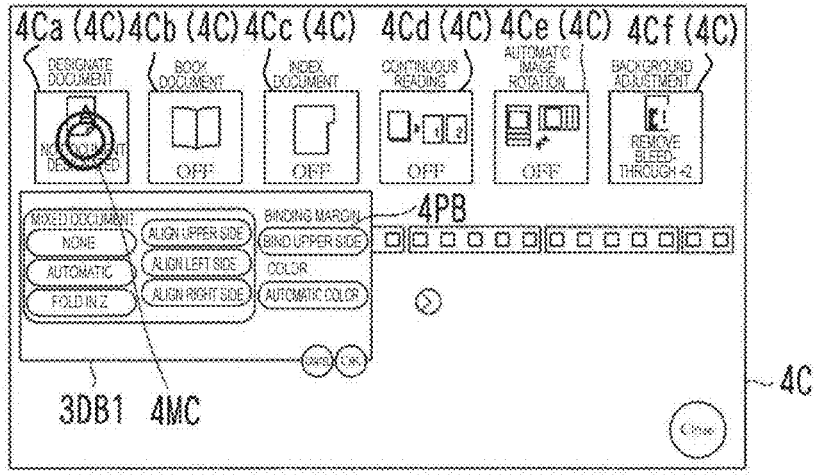

When the scroll is finished as shown in FIG. 25B, the image forming apparatus 1B displays a mark 4MC corresponding to double tap on the optional function badge 4Ca as shown in FIG. 25C on the basis of the record 5Fc, and displays a dialog box 3DB1 on the copy job screen 3C.

Figure 26A:
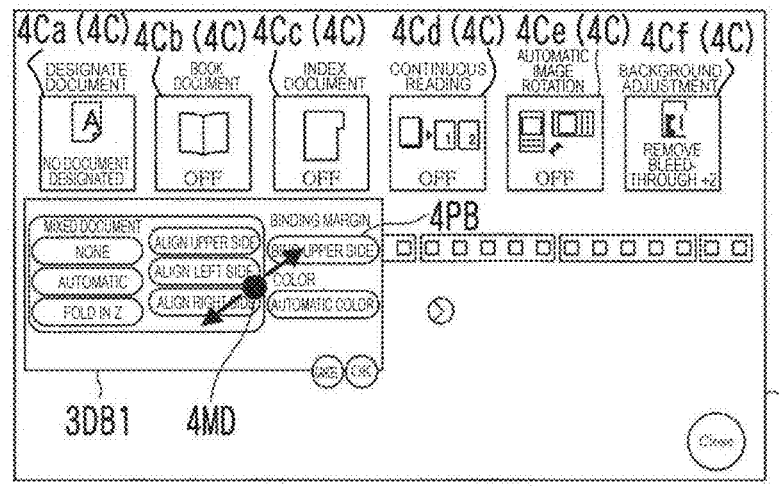
FIGS. 26A to 26C are figures illustrating an example of transition of a screen when operation is played back.

The image forming apparatus 1B displays a mark 4MD1 corresponding to the start position and direction of pinch as shown in FIG. 26A on the basis of the record 5Fd, and starts to enlarge a dialog box 3DB1.

Figure 26B:
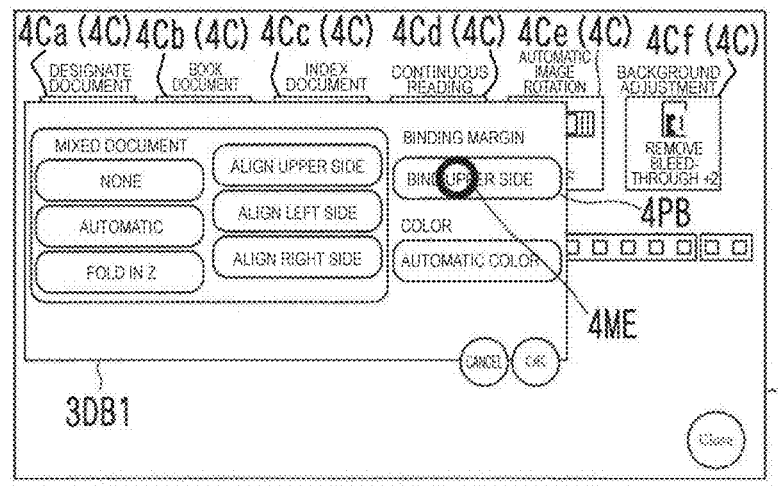
Figure 26C:
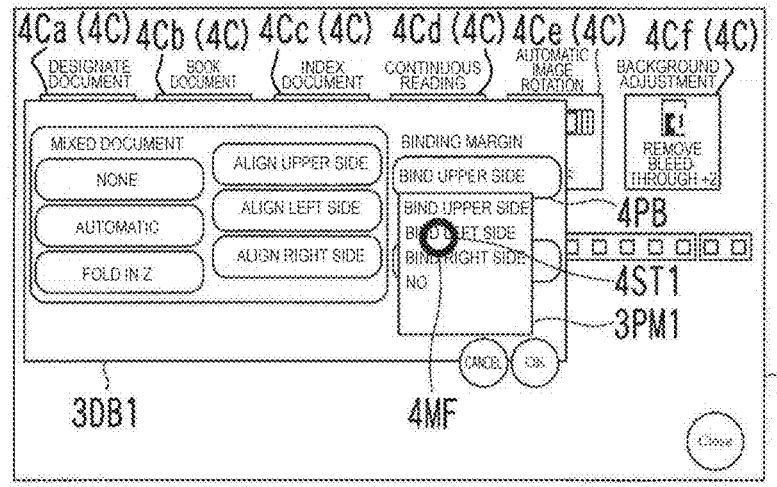

When the dialog box 3DB1 has been enlarged as shown in FIG. 26B, the image forming apparatus 1B displays the mark 4ME representing tap on the pull-down button 4PB on the basis of the record 5Fe, and displays a pull-down menu 3PM1 as shown in FIG. 26C.

Figure 27A:
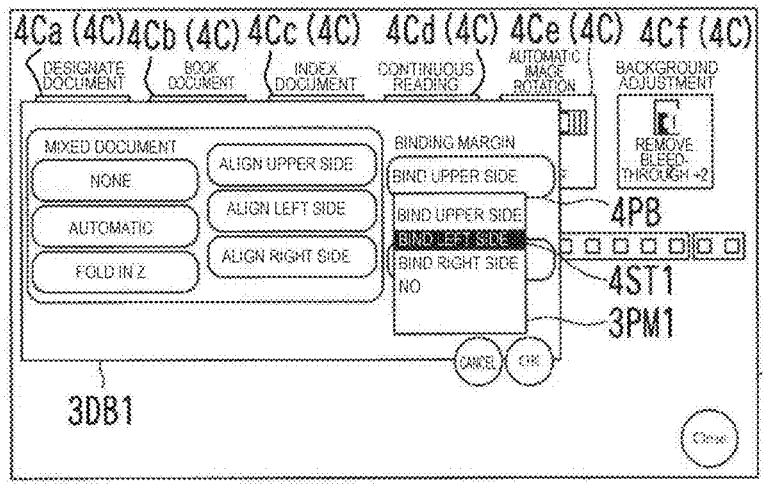
FIGS. 27A to 27C are figures illustrating an example of transition of a screen when operation is played back.
Figure 27B:
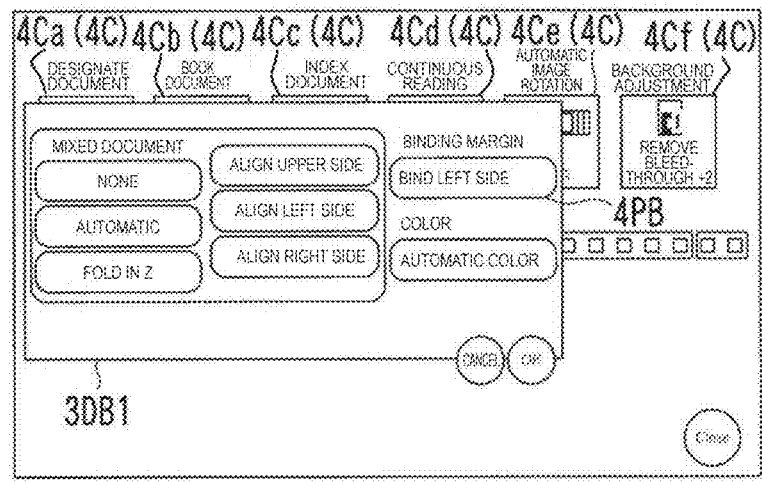

The image forming apparatus 1B displays a mark 4MF corresponding to tap on the selection option 4ST1 on the basis of the record 5Ff. Then, after the mode of the selection option 4ST1 is changed as shown in FIG. 27A, and thereafter, as shown in FIG. 27B, the pull-down menu 3PM1 is closed.

Figure 27C:
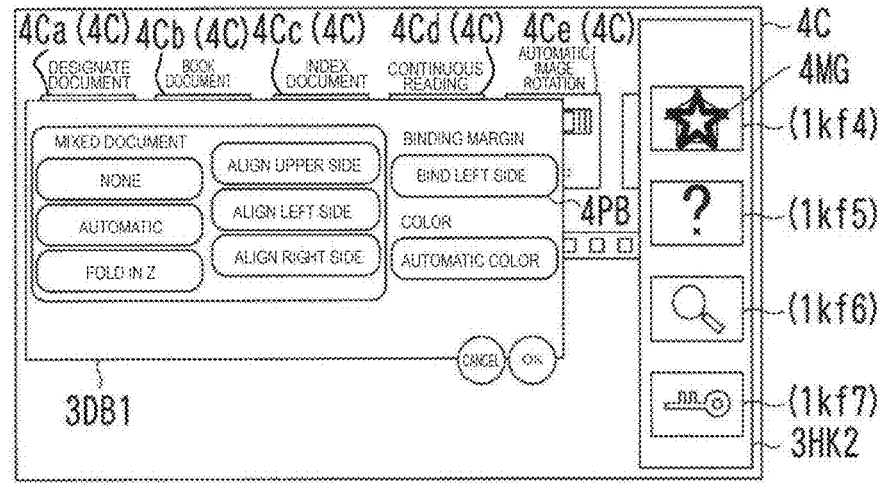

The image forming apparatus 1B displays the hard key panel right-side screen 3HK2 on the copy job screen 3C as shown in FIG. 27C on the basis of the record 5Fg, and displays a mark 4MG representing press-down on the image of the function key 1$kf$4. Then, the hard key panel right-side screen 3HK2 is closed, and instead of the copy job screen 3C, the home screen 3T (see FIG. 24A) is displayed again.

According to the present embodiment, the processing of the display based on operation performed on the touch panel can be played back more reliably than in the past. In particular, even when the operation log data 5F generated by a certain image forming apparatus 1 is used by another image forming apparatus 1 having different contents in its specifications and settings, the play-back can be performed more reliably than in the past. Therefore, regardless of the contents in the specifications and settings of the image forming apparatus 1, the operation log data 5F can be distributed, and an end user or a service engineer can learn how to perform operation.

In the present embodiment, the touch panel 10$k$3 is a touch panel of a method for detecting direct contact with a finger or a pen. However, the present invention can be applied to a non-contact touch panel. Instead of the liquid crystal display 10$k$2, a display of other methods such as a plasma display can be used.

The format of the operation log data 5F is desirably a generally-available format such as CSV (Comma Separated Value), so that the operation log data 5F can be shared even if multiple image forming apparatuses 1 are of different models.

The present invention can be applied to a case where gestures other than the types shown as examples in the present embodiment (for example, rotation, swipe with four fingers, and the like) are used.

In addition, the entire configuration or the configuration of each unit of the image forming apparatus 1, the processing contents, the processing procedures, the configuration of data, the configuration of screens, and the like can be changed as necessary in accordance with the gist of the present invention.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image forming apparatus comprising a display and a touch panel provided on a display surface of the display, the image forming apparatus comprising a normal mode in which processing is performed every time operation is performed with the touch panel and a play back mode in which processing is performed on the basis of recording of the operation, the image forming apparatus comprising a controller configured to:
    determine a gesture represented by a series of touch events every time the series of touch events is performed on a first area of the touch panel in the normal mode, the first area being defined as a first portion of the touch panel;
    store gesture log data representing the gesture determined and touch event log data representing the series of touch events performed on a second area of the touch panel to a storage unit, the second area being defined as a second portion of the touch panel distinct from the first area;
    determine display control processing for displaying an operation screen on the display,
    wherein in the normal mode,
    a) in a case where the series of touch events is performed on the first area, the display control processing is determined on the basis of the gesture determined, and
    b) in a case where the series of touch events is performed on the second area, the display control processing is determined on the basis of an object at a position where the series of touch events is performed, and
    wherein in the play back mode,
    c) in a case where the series of touch events is performed on the first area, the display control processing is determined on the basis of the gesture log data, and
    d) in a case where the series of touch events is performed on the second area, the display control processing is determined on the basis of the touch event log data; and
    execute the determined display control processing.

2. The image forming apparatus according to claim 1, wherein the gesture log data further indicates a first time at which the gesture is performed, and the touch event log data further indicates a second time at which the series of touch events is performed, and
    in the play back mode, the display control processing is performed on the basis of the first time and the second time.

3. The image forming apparatus according to claim 1, wherein the storage unit is a storage unit configured to store an operation log possessed by the image forming apparatus.

4. The image forming apparatus according to claim 1, wherein the storage unit is a portable storage medium.

5. The image forming apparatus according to claim 1, wherein the storage unit is a server.

6. An image forming apparatus comprising a display and a touch panel provided on a display surface of the display, the image forming apparatus comprising a normal mode in which processing is performed every time operation is performed with the touch panel and a play back mode in which processing is performed on the basis of recording of the operation, the image forming apparatus comprising a controller configured to:
    determine a gesture represented by a series of touch events every time the series of touch events is performed on the touch panel in the normal mode;
    obtain gesture log data representing the gesture represented by the series of touch events performed on a second touch panel of another image forming apparatus;
    determine display control processing for displaying an operation screen on the display, on the basis of the determined gesture log and the obtained gesture log data,
    wherein
    a) in the normal mode, the display control processing is determined on the basis of the determined gesture,
    b) in the play back mode, the display control processing is determined on the basis of the obtained gesture log data; and
    execute the determined display control processing.

7. The image forming apparatus according to claim 6, wherein the gesture log data are obtained from a portable storage medium.

8. The image forming apparatus according to claim 6, wherein the gesture log data are obtained from a server.

9. A non-transitory storage medium including a computer program that can be executed by an image forming apparatus comprising a display and a touch panel provided on a display surface of the display, the image forming apparatus comprising a normal mode in which processing is performed every time operation is performed with the touch panel and a play back mode in which processing is performed on the basis of recording of the operation, the non-transitory storage medium causing the image forming apparatus to:
    execute determination processing for determining, every time a series of touch events is performed on a first area of the touch panel in the normal mode, a gesture represented by the series of touch events, the first area being defined as a first portion of the touch panel;
    execute storage processing for storing, to a storage unit, gesture log data representing the gesture determined and touch event log data representing the series of touch events performed on a second area of the touch panel, the second area being defined as a second portion of the touch panel distinct from the first area;
    execute determination processing for determining display control processing for displaying an operation screen on the display,
    wherein in the normal mode,
    a) in a case where the series of touch events is performed on the first area, the display control processing is determined on the basis of the gesture determined, and
    b) in a case where the series of touch events is performed on the second area, the display control processing is determined on the basis of an object at a position where the series of touch events is performed, and
    wherein in the play back mode,
    c) in a case where the series of touch events is performed on the first area, the display control processing is determined on the basis of the gesture log data, and d) in a case where the series of touch events is performed on the second area, the display control processing is determined on the basis of the touch event log data; and execute the display control processing determined in the determination processing.

10. A non-transitory recording medium storing a computer readable program used for an image forming apparatus comprising a display and a touch panel provided on a display surface of the display, the image forming apparatus comprising a normal mode in which processing is performed every time operation is performed with the touch panel and a play back mode in which processing is performed on the basis of recording of the operation, the non-transitory recording medium storing a computer readable program causing the image forming apparatus to:

execute determination processing for determining, every time a series of touch events is performed on the touch panel in the normal mode, a gesture represented by the series of touch events;

execute obtaining processing for obtaining gesture log data representing the gesture represented by the series of touch events performed on a second touch panel of another image forming apparatus;

execute determination processing for determining display control processing for displaying an operation screen on the display, wherein in the determination processing, a) in the normal mode, the display control processing is determined on the basis of the determined gesture, b) in the play back mode, the display control processing is determined on the basis of the obtained gesture log data; and execute the display control processing determined in the determination processing.

* * * * *